US012166872B2

(12) United States Patent
Kubovcik et al.

(10) Patent No.: US 12,166,872 B2
(45) Date of Patent: Dec. 10, 2024

(54) ELECTRONIC ACCESS CONTROL MULTI-FACTOR AUTHENTICATION USING CENTRALIZED HARDWARE SECURED CREDENTIAL SYSTEM AND METHODS OF USE THEREOF

(71) Applicant: THALES DEFENSE & SECURITY, INC., Clarksburg, MD (US)

(72) Inventors: Greg Kubovcik, Avondale, PA (US); Lloyd Mitchell, Hockessin, DE (US); Bill Becker, Abingdon, MD (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 0 days.

(21) Appl. No.: 17/067,346

(22) Filed: Oct. 9, 2020

(65) Prior Publication Data

US 2021/0111885 A1 Apr. 15, 2021

Related U.S. Application Data

(60) Provisional application No. 62/912,981, filed on Oct. 9, 2019.

(51) Int. Cl.
*H04L 9/08* (2006.01)
*H04L 9/32* (2006.01)

(52) U.S. Cl.
CPC .......... *H04L 9/0877* (2013.01); *H04L 9/0825* (2013.01); *H04L 9/0866* (2013.01); *H04L 9/3234* (2013.01)

(58) Field of Classification Search
CPC ... H04L 9/0877; H04L 9/0825; H04L 9/0866; H04L 9/3234

(Continued)

(56) References Cited

U.S. PATENT DOCUMENTS 8,818,897 B1 * 8/2014 Slodki ..................... G06F 21/51
726/17
9,491,155 B1 * 11/2016 Johansson ............. G06F 21/604
(Continued)

FOREIGN PATENT DOCUMENTS

CN 104094270 A * 10/2014 ......... H04L 63/0815

OTHER PUBLICATIONS

Nyczepir, "Defense agency surmounts 'big' security challenge for robotic process automation", [https://www.fedscoop.com/defense-logistics-agency-security-rpa/], May 15, 2019.

*Primary Examiner* — Moeen Khan
(74) *Attorney, Agent, or Firm* — ArentFox Schiff LLP

(57) ABSTRACT

Aspects of the present disclosure include a tokenless, network-attached, multi-factor authentication software based electronic access control logon system and methods of use thereof, and may provide equivalent in security to a Public Key Infrastructure smart card system. The logon system may allow tokenless, but authorized, entities to access secure systems, with the secure logon system not requiring placement of individual or organization identifying information on a physical object that may be removed from a restricted location. Aspects of the present disclosure may include maintaining user credentials within individually encrypted credential bins within a Credential Hardware Security Module (HSM) that is securely accessible by authorized endpoints in a distributed network. A successful logon may occur when an authorized user accesses the user's corresponding credential bin within the Credential HSM via an additionally authorized corresponding device, such that the device and user authentication may combine to provide multi-factor authentication.

9 Claims, 31 Drawing Sheets

(58) Field of Classification Search
USPC ......................................................... 713/189
See application file for complete search history.

(56) References Cited

U.S. PATENT DOCUMENTS

| | | | |
|---|---|---|---|
| 11,888,997 B1* | 1/2024 | Bowen .................. | H04L 9/3247 |
| 2004/0187018 A1* | 9/2004 | Owen ..................... | H04L 9/321 |
| | | | 713/184 |
| 2005/0201529 A1* | 9/2005 | Nelson ................. | H04M 3/5116 |
| | | | 379/49 |
| 2008/0010449 A1* | 1/2008 | Holtzman ............. | G06F 21/445 |
| | | | 713/157 |
| 2008/0028206 A1* | 1/2008 | Sicard ................. | H04L 63/0407 |
| | | | 713/156 |
| 2008/0049942 A1* | 2/2008 | Sprunk .................. | H04L 9/006 |
| | | | 380/283 |
| 2011/0307724 A1* | 12/2011 | Shaw ...................... | G06F 21/34 |
| | | | 713/323 |
| 2015/0227733 A1* | 8/2015 | Yu ........................... | G06F 21/31 |
| | | | 726/19 |
| 2018/0063244 A1* | 3/2018 | Maturana .............. | G06F 9/5072 |
| 2018/0349881 A1* | 12/2018 | Steele ................. | G06Q 20/3223 |
| 2019/0007204 A1* | 1/2019 | Field ................... | G06F 21/6218 |
| 2020/0097315 A1* | 3/2020 | Faynberg .............. | H04L 9/3263 |
| 2020/0153623 A1* | 5/2020 | Asanghanwa ........ | H04L 9/3213 |
| 2021/0051002 A1* | 2/2021 | Cheng .................. | H04L 9/0819 |

\* cited by examiner

Unattended Robot Domain Logon

➤ Admin Commands Robots to Perform Windows Logon

Start Job

| ☐ ROBOT ⇅ | MACHINE ⇅ | STATUS ⇅ |
|---|---|---|
| ⊘ ADMINISTRATOR | Uipath82 | Available |
| ☑ Jerry_Bot | Uipath82 | Available |
| ⊘ GeorgeBot | Uipath82 | Available |

Items: 10 ▾  |◁  ◁  Page 1/1  ▷  ▷|  3 Items

[CANCEL] [START]

FIG. 5

Unattended Robot Domain Logon

- Robot Initiates Windows Logon for Specified Robot
- Robot Provides User Info and Password

- Windows Logon Proceeds Using Keys in Credential HSM
- Robot Performs Planned Tasks User Windows Logon

Attended Robot Secure Web Site Logon

Unattended Robot Windows Logon

| ☐ PROCESS ⇕ | ROBOT ⇕ | ENVIRONMENT | S... | STARTED ⇕ | S... | ENDED ⇕ | SOURCE ⇕ |
|---|---|---|---|---|---|---|---|
| ⊙ LCSSecureWebLog... | Jerry_Bot | TestEnv1 | | 3 minutes ago | | 3 minutes ago | Manual |

Items: 10 ▽   ⏮ ＜ Page 1/1 ＞ ⏭

FIG. 13A

Jobs

Unattended Robot Windows Logon Continued ......

Command sent...

State: All | Source: All | Interval: Last day

| PROCESS | ROBOT | ENVIRONMENT | S... | STARTED | S... | ENDED | SOURCE |
|---|---|---|---|---|---|---|---|
| LCSSecureWebLog... | Jerry_Bot | TestEnv1 | | 4 minutes ago | | 3 minutes ago | Manual |

Page 1/1

Items: 10

FIG. 15A

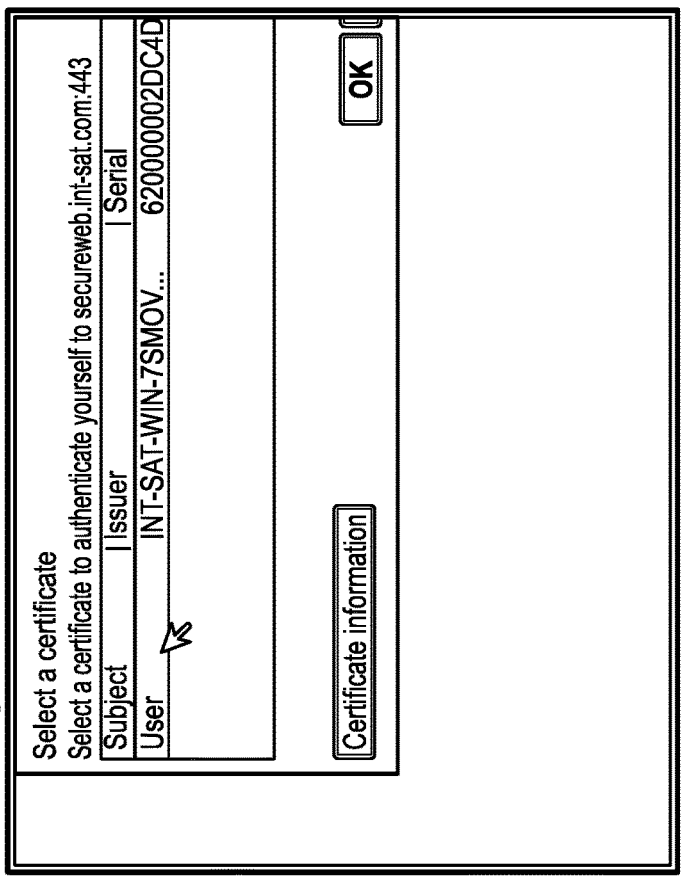
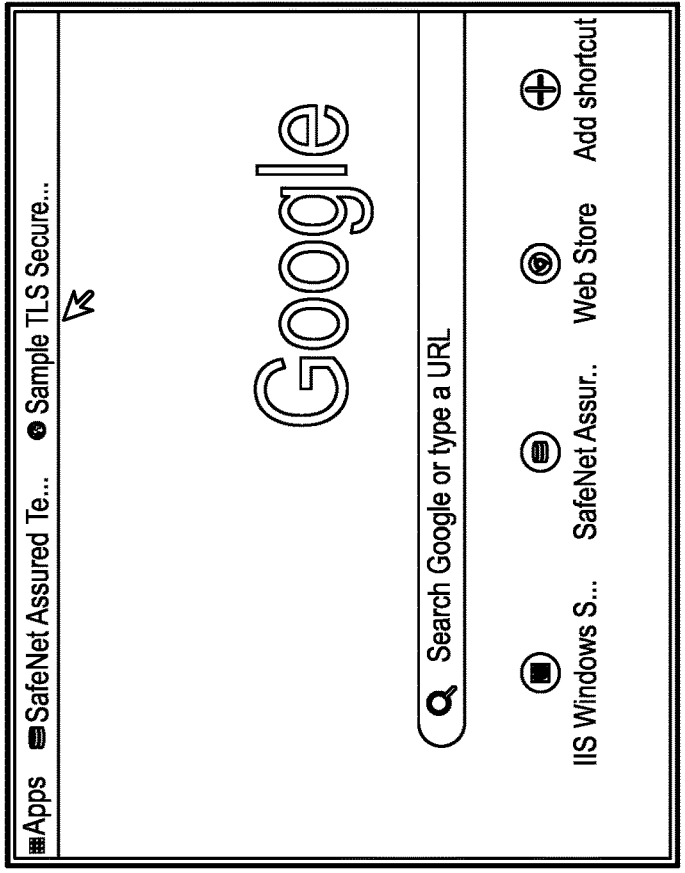
User Secure Website Logon
FIG. 17B
FIG. 17A

User Secure Website Logon Continued ......

Certificate Information

This certificate is intended for the following purpose(s):
- Proves your identity to a remote computer
- Protects e-mail messages
- Smart Card Logon Issued to: elaine Issued by: INT-SAT-WIN-7SM0VG4V7A3-CA-1

Valid from: 10/2/2019 to 10/1/2020

Issuer Statement

OK

...ticate yourself to secureweb.int-sat.com:443

| Issuer | Serial |
|---|---|
| INT-SAT-WIN-7SM0V... | 620000002DC4 |

ELECTRONIC ACCESS CONTROL MULTI-FACTOR AUTHENTICATION USING CENTRALIZED HARDWARE SECURED CREDENTIAL SYSTEM AND METHODS OF USE THEREOF

CROSS-REFERENCE TO RELATED APPLICATIONS

This application claims priority to U.S. Provisional Application No. 62/912,981, filed on Oct. 9, 2019. The prior application is incorporated by reference herein in its entirety.

BACKGROUND OF THE TECHNOLOGY

Field

Aspects of the present disclosure relates to the field of information and data security within electronic access control systems, and in particular data security relating to electronic access control multi-factor authentication using a centralized hardware credential system, and methods of use thereof.

Background

Access control systems, used in the fields of physical and information security, for example, are implemented to selectively restrict access of a physical location, server, or other resource to authorized people or other entities. Such systems vary in level of security, and may include physical objects, such as turnstiles or mechanical lock-and-key systems, or people, such as security guards, police, or other authenticating personnel. However, the rapid technological advancement of the past half century has resulted in a similar advancement of access control systems and subsequent implementation of electronic access control systems. Electronic access control systems are especially prevalent in applications requiring restricted access control with regard to encrypted data, secure servers, classified electronic databases, and other similar sensitive computer based system aspects. Within environments that require lower levels of security, such as personal laptops, electronic access control systems may be limited to authentication that includes a username and a password known only by the authorized entity. However, such electronic access control systems are relatively easy for unauthorized entities to hack utilizing schemes such as phishing scams.

Conversely, within organizations and other environments that routinely handle highly sensitive information, a significantly increased level of security is required. For example, the current standard for electric access control logon systems implemented within the U.S. Federal Government includes Public Key Infrastructure (PKI). A PKI system relies on multi-factor authentication in order for an entity to access secure data. Typically, multi-factored authentication includes two sources on identity verifying information: "what you have" and "what you know." Specifically, for example, a PKI may include a securely stored private key and an associated digital certificate that comprises the unique user credentials that identify the entity. Tangibly, such digital certificate is often stored on a smart card, chip card, or integrated circuit card, frequently referred to as a Common Access Card (CAC). Most smart card systems typically include a plastic key card, comparable to a credit card, embedded with an integrated circuit and an associated pattern of metal contacts. Such a "smart card" not only houses the digital certificate, but also personal identification information and organization identifying information. Because an unauthorized entity would need obtain both the personal identification information stored within the card and the physical card itself in order to access the restricted resource, security is enhanced specifically when the authorized individual carries the physical card with them at all times.

Though an effective system, significant disadvantages remain with such existing smart card PKI systems. In particular, because the physical smart card is carried on the body of the authorized individual to which the smart card was issued, a risk exists that the card itself may be compromised ("hacked"), and the secure data may then be vulnerable to access by unrestricted entities, if not entirely compromised, especially when the smart card and authorized individual are in public. For example, there reportedly have been instances recorded where information securely stored within a smart card has been stolen by radio-frequency identification (RFID) scanners or other functionally equivalent chip scanners discretely placed in unidentified public locations, such as subway stations. After an unauthorized entity obtains the sensitive personal identification information and organization identifying information housed within the card, it may be possible to reconstruct a duplicate physical smart card and subsequently use the information stolen via the scan, or additional necessary information may otherwise be obtained, such as by phishing, in order to access the encrypted data, secure location or website, etc., via any device capable of reading a smart card.

Further, in additional locations, users may not be able to physically bring the appropriate credentials into the secure location; for example, some government agencies may not allow for physical objects, such as CAC cards, to be brought into locations by users. Thus, users may not be able to log onto the secure systems in the absence of such certificates.

Additionally, due to the wide implementation of smart card logon security systems consequent of the government established PKI standard, an additional issue has arisen with regard to the need for systems and processes of granting access to secured data for authorized entities not capable of physically maintaining a smart card, such as a device, software robot, or other comparable automation technology.

SUMMARY

Consequent of the problems and deficiencies as described above, as well as others, there remains an unmet need for tokenless, multi-factor authentication software based electronic access control systems and methods of use thereof, at least equivalent in security to that of a PKI smart card system and that allow non-smart card wielding authorized entities access to secure systems, such that the security solution does not require either personal identification information or organization identifying information to leave a closed or otherwise restricted physical location.

In view of the above problems and shortcomings, as well as others, aspects of the present disclosure relate, among other things, to secure software-based PKI smart card equivalent, electronic access control systems and methods of use thereof implementable within an environment where authentication and authorization processes may incorporate secure highly sensitive data, websites, databases, and other similar protected information. According to various aspects of the present disclosure, such systems and methods may maintain user credentials in a centralized hardware device that is securely accessible by endpoints in a distributed network. Through a client organization authorized user, for example, a cryptographic boundary on a host computer or other comparable device may securely connect to a remote Credential Hardware Security Module (HSM) and leverage its secure container capabilities for cryptographic storage and processing of authorized user identification credentials. Consequently, the identity credentials may be retained within the security boundary of the Credential HSM.

The above presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BRIEF DESCRIPTION OF THE FIGURES

FIGS. 13A and 13B illustrate various features of an example implementation of a logon system, in accordance with aspects of the present disclosure.

FIGS. 15A and 15B illustrate various features of an example implementation of a logon system, in accordance with aspects of the present disclosure.

FIGS. 17A and 17B illustrate various features of an example implementation of a logon system, in accordance with aspects of the present disclosure.

FIGS. 18A-18C illustrate various features of an example implementation of a logon system, in accordance with aspects of the present disclosure.

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Figure 1:
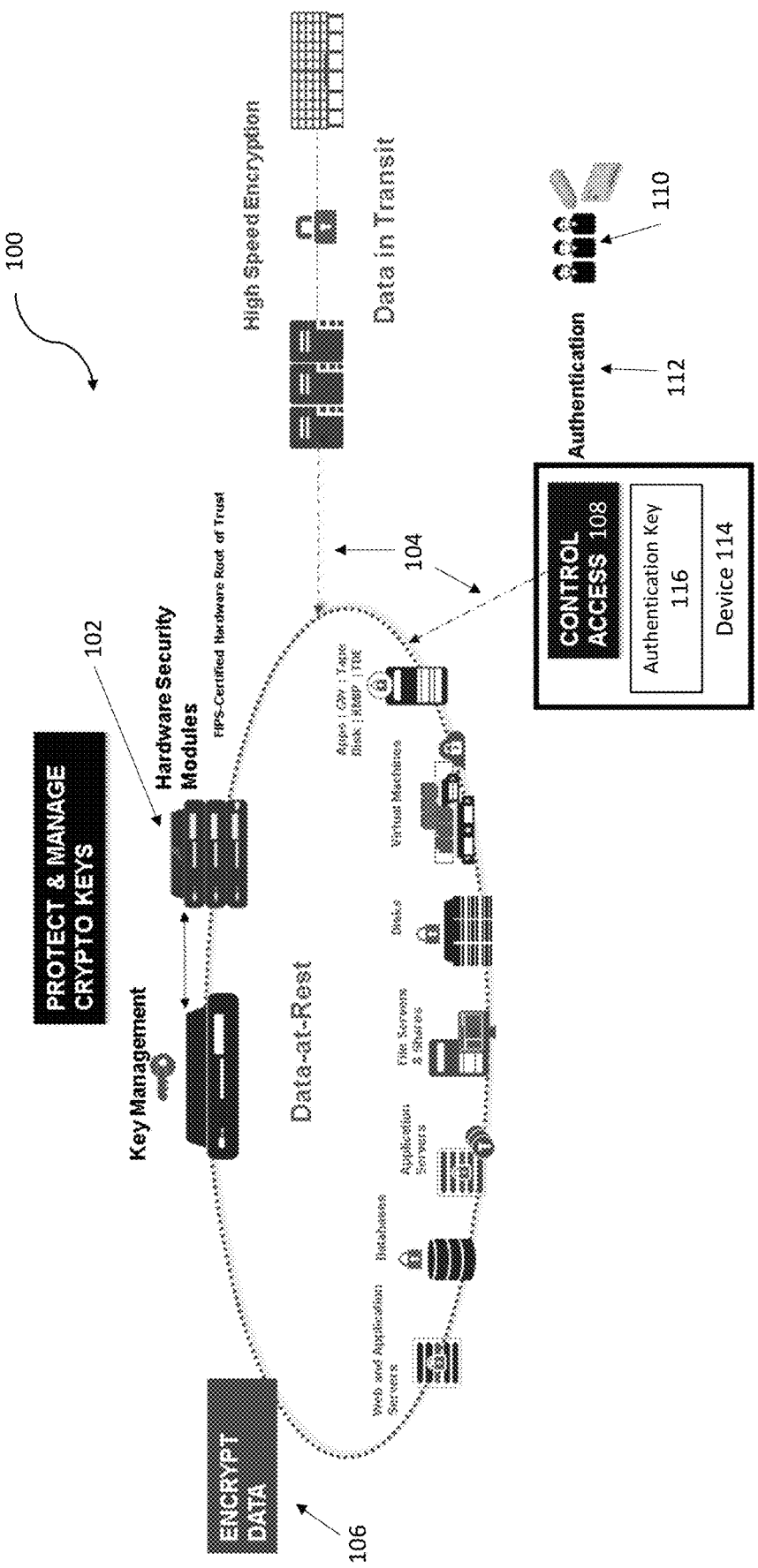
FIG. 1 illustrates an overview diagram of various aspects of an example logon system in accordance with aspects of the present disclosure.

According to an aspect of the present disclosure, FIG. 1 illustrates a general overview diagram of an example credential system, also interchangeably hereinafter referred to as "logon system," that includes a credential-based logon PKI security system controlling access of restricted data belonging to specific client organizations, such as government agencies, including but not limited to the Department of Defense, the Department of Homeland Security, the Department of State, etc., with regard to human and non-human entities authorized by such client organizations.

FIG. 1 contains a representative diagram of the general flow of secure data and other information among various hardware components of an example logon system 100. In one example, a user 110, which may comprise a human user, a software robot, automation technology, Robotic Process Automation (RPA), or any other combination thereof, may attempt to access encrypted data 106 via logon system 100 via an access control user interface 108. In one example, the access control user interface 108 may be or include a Windows® or other program home login screen accessed by user 110 by contemporaneously pressing the control, alt, and delete computer keys, for example. In another example, access control user interface may include a secure website or webpage logon screen navigated to by user 110, wherein user 110 is subsequently prompted to enter a user provided authentication key 112, such as a passcode, user name, personal identification number, etc., in order to verify authorization and access encrypted data 106. Authentication interface may include a device 114, access control user interface 108, and a device authentication key 116, wherein authentication key 116 identifies device 114 as a device authorized to access Credential HSM 102. Encrypted data 106 may include, but is not limited to: virtual machines, disks, file servers, shares, application servers, databases, web servers, application servers, and other similar features for maintaining sensitive, controlled or classified data secured by the authorizing client organization. Upon an access attempt by user 110, device 114 may establish a Transport Layer Security (TLS) communication link 104 with Credential HSM 102, in order to access securely stored authentication and identification information. Further, TLS communication link 104 may comprise cryptographic protocols designed to a provide a secure method of transfer of encrypted data 106 within logon system 100.

According to an aspect of the present disclosure, Credential HSM 102 may comprise a physical computing device, including, for example, at least one secure cryptoprocessor chip that safeguards and manages authorized user credentials, including but not limited to, personal identification information, passwords, usernames, or other similar digital keys. Further, a single Credential HSM 102 may provide a stable architecture for any suitable number of individually encrypted credential bins, such as 20 individually encrypted credential bins, for example, wherein an individual credential bin may house the credentials associated with a specific authorized user 110 and a specific authorized device 114. In another example, Credential HSM 102 configured with additional memory may support upwards of 100,000 individually encrypted credential bins. Furthermore, Credential HSM 102 may include features that provide evidence of physical tamper, digital tamper, or other forms of unauthorized access attempts, wherein the evidence may additionally render the HSM inoperable upon tamper detection, providing an additional layer of data security. The secure cryptoprocessor included within Credential HSM 102 may comprise a computer-on-chip, microprocessor, or similar device embedded within hardware capable of executing cryptographic operations that protect stored credentials, wherein the cryptoprocessor may include multiple physical security measures providing tamper resistance. Additionally, the cryptoprocessor may be configured to output only encrypted data to ensure maintenance of security measures of encrypted data 106.

In comparison with related art smart card PKI security systems, logon system 100 achieves PKI multi-factor authentication via the contemporaneous and accurate combination of use of a user provided authentication key 112, known only by user 110, and a device authentication key 116, unique to each authorized device 114, instead of requiring a combination of known information and a physical token, card, or other authenticating object. In one example implementation of logon system 100 described in FIG. 1, there may be a one to one correspondence between users 110 and devices 114. In another example implementation, there may be an unequal correspondence between users 110 and devices 114, wherein one user 110 may be authorized to access encrypted data 106 via a plurality of devices 114, for example, or conversely, a plurality of users 110 may be authorized to access encrypted data 106 via a single device 114.

Consequent of differences in multi-factor authentication techniques, logon system 100 may be comparatively more secure than a smart card based security system at least because device 114 may, for example, be further secured in an access controlled facility, building, or otherwise similarly secure location. Consequently, even if an authentication key 112 is stolen or otherwise compromised by an unauthorized entity, any access attempt by said unauthorized entity to logon system 100 must also originate from a correspondingly authorized logon device. Consequently, logon system 100 would require such an unauthorized entity to both acquire authentication key 112 and the correctly access corresponding device 114. Any access attempts originating from a device other authorized device 114 result in denied access to the Credential HSM 102 and thus denied access to encrypted data 106.

Figure 2:
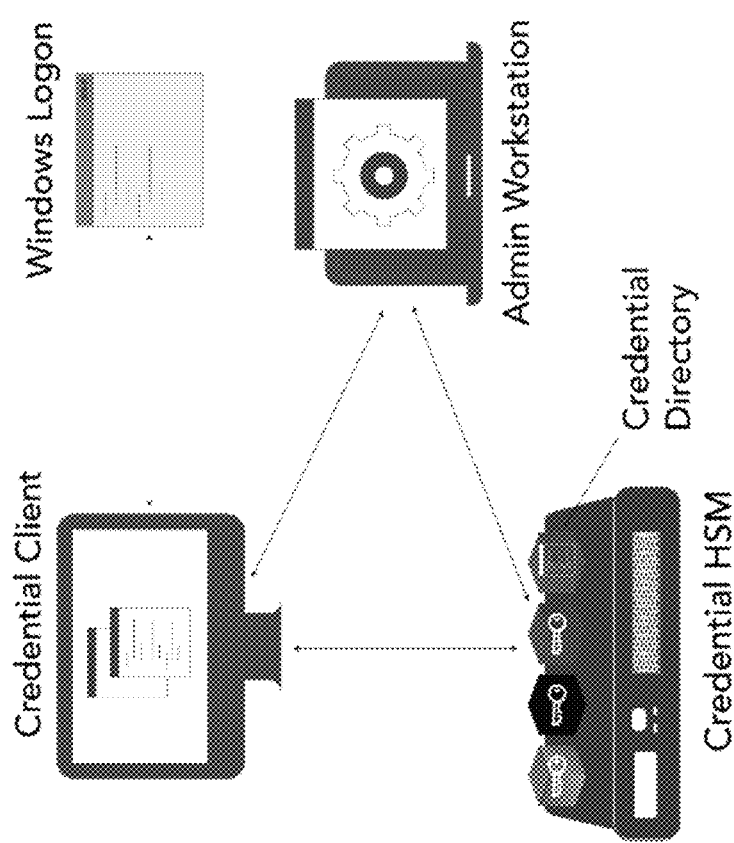
FIG. 2 illustrates a simplified overview diagram of certain features of an example logon system in accordance with aspects of the present disclosure.

FIG. 2 is a block diagram of an example implementation of logon system 100, wherein logon system 100 comprises Credential HSM 102 and access control user interface 108. FIG. 2 illustrates possible components of Credential HSM 102, including a credential directory 120 and credential bins 122. Credential bins 122 may be individually encrypted so as to provide an additional layer of security through the compartmentalization of sensitive information, as individual credential bins 122 may house authentication information corresponding to both a specific user 110 accessing the authentication information via a specific device 114. As discussed with respect to FIG. 1, an individual credential bin 122 may only be accessed by user 110 via authenticated device 114, wherein device 114 includes an authorized endpoints corresponding specifically to each respective user 110.

According to aspects of the present disclosure, FIGS. 3-15 illustrate various features and a plurality of different environments with respect to a login system, such as logon system 100 of FIG. 1, may be implemented.

Figure 3:
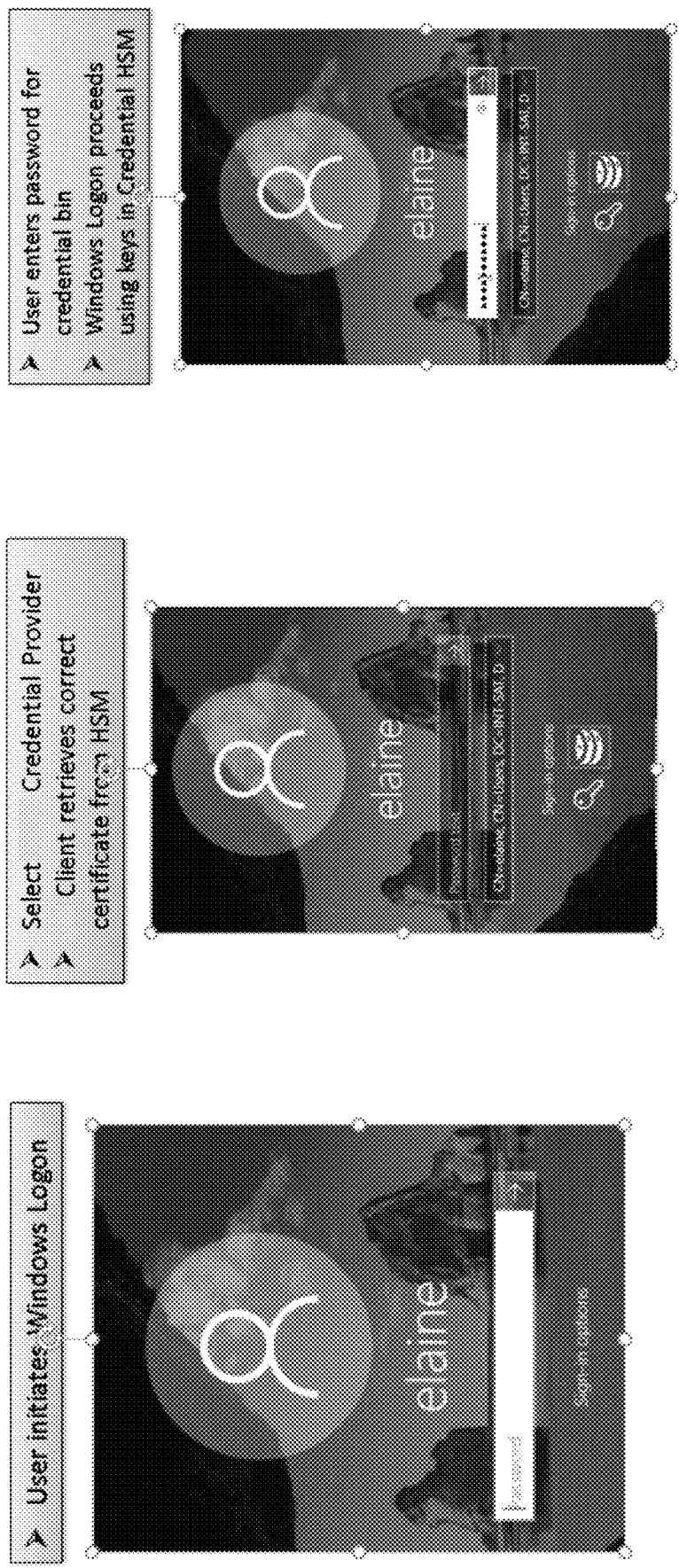
FIG. 3 illustrates various features of an example implementation of a logon system within a domain logon environment, in accordance with various aspects of the present disclosure.

FIG. 3, according to an aspect of the present disclosure, illustrates an example graphical user interface (GUI) screen, such as within a Windows® domain logon interface, wherein user (e.g., human user 110, as illustrated in FIG. 1), may initiate a logon. The user 110 may then select a logon system (e.g., login system 100 of FIG. 1) via access control user interface (e.g., interface 108 of FIG. 1). Upon the aforementioned selection, the user may select the correct certificate from a list of certificates provided by Credential HSM and then enter a corresponding authentication key to access the corresponding credential bin of that user.

Figure 4:
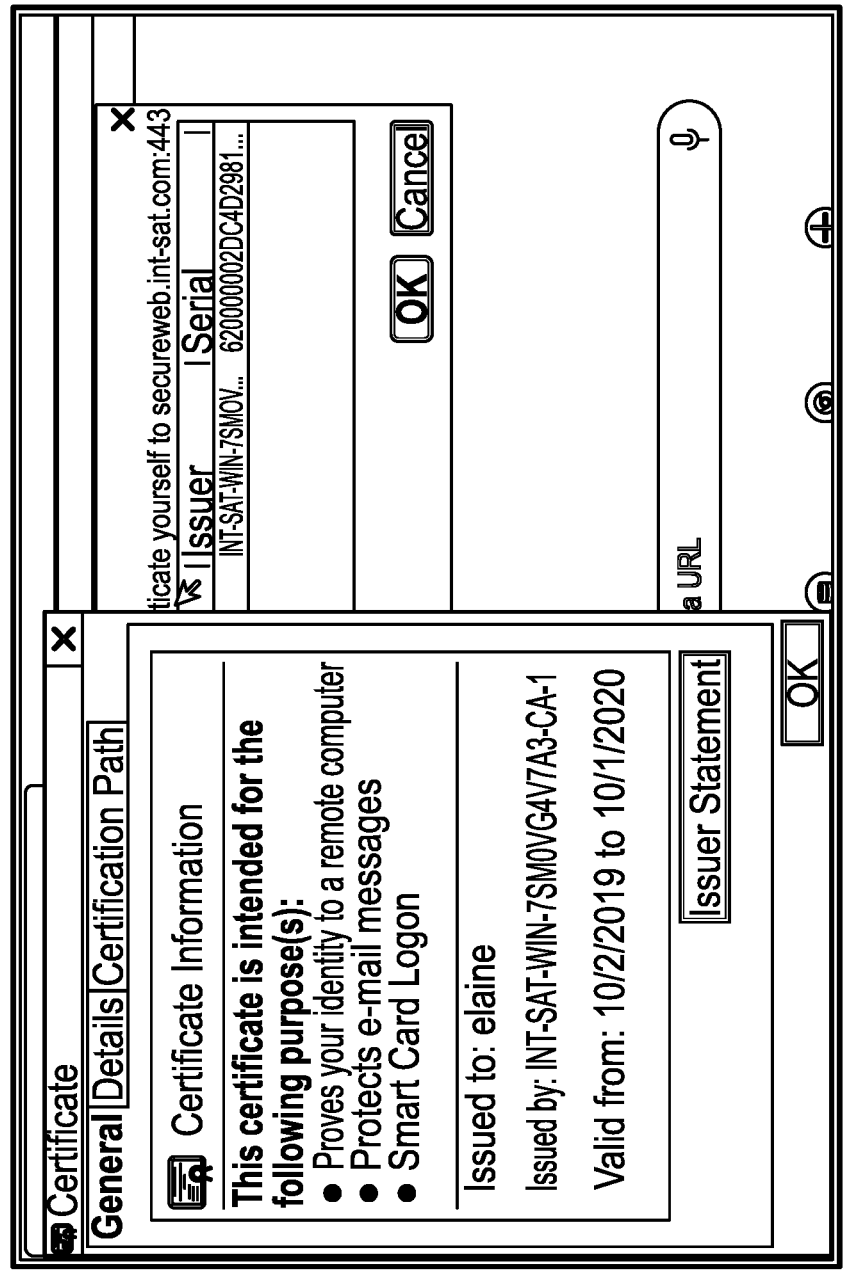
FIG. 4 illustrates various features of an example implementation of a logon system within a secure web page logon environment, in accordance with aspects of the present disclosure.
Figure 4:
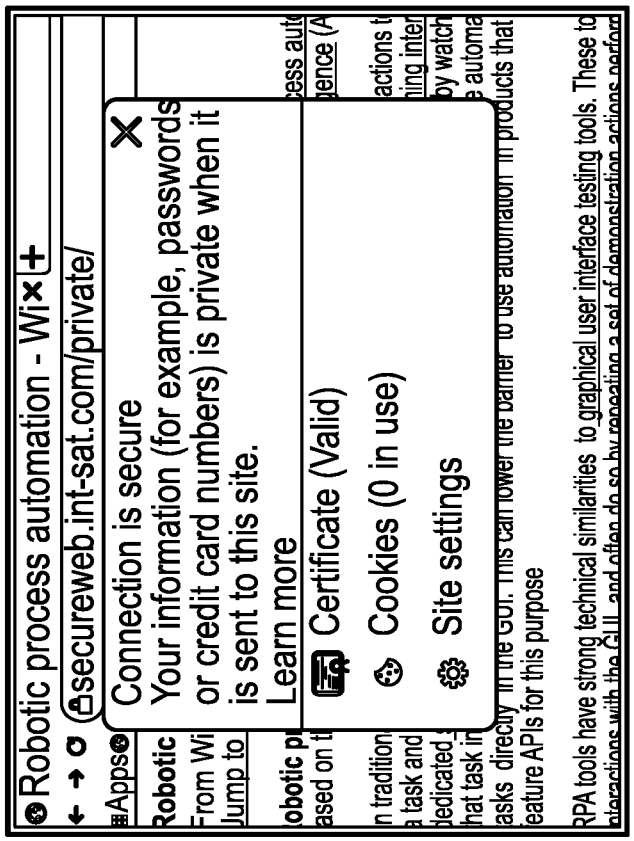
Figure 4:
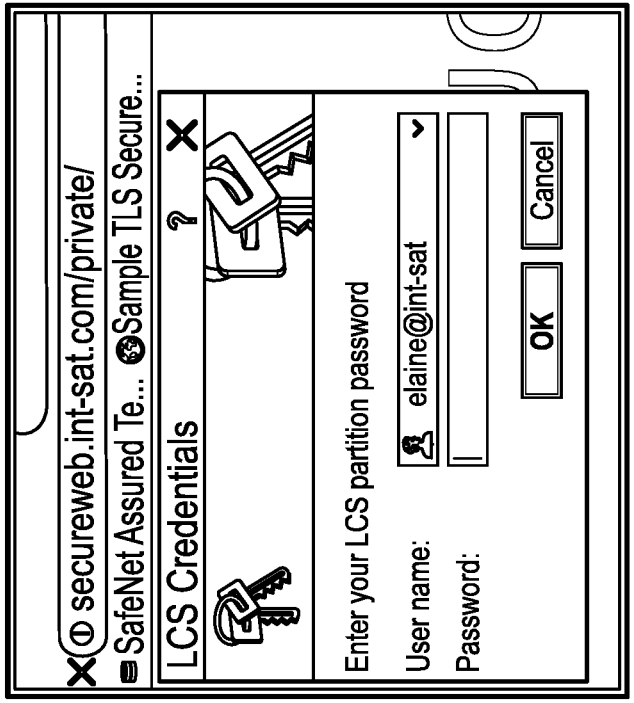

According to further aspects of the present disclosure, FIG. 4 illustrates an example implementation of an example logon system (e.g., logon system 100 of FIG. 1) within a secure web page logon environment. Within the secure web page logon, such user may include a person or a robot, automation technology, or the like.

Figure 5:
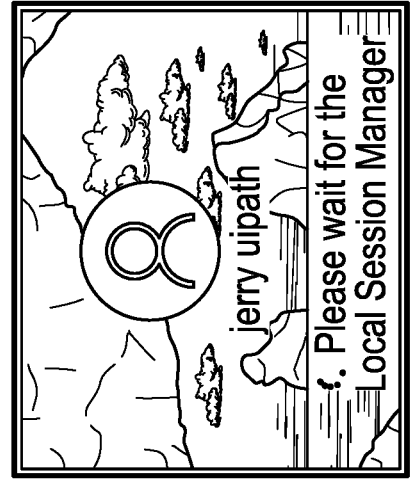
FIG. 5 illustrates various features of an example implementation of a logon system within a domain login environment, in accordance with aspects of the present disclosure.
Figure 5:
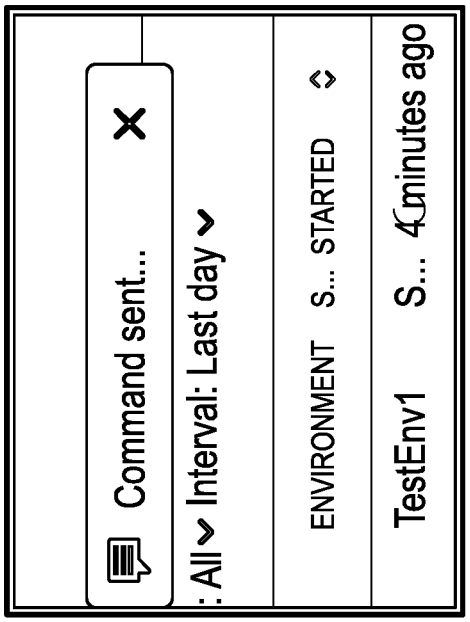

FIG. 5, according to an aspect of the present disclosure, illustrates an example implementation of a logon system within a logon domain environment, such as within a Windows® logon environment, that includes access by an unattended robot user. Within the illustrated domain logon environment, a human or software administrator may command the unattended robot user to perform a login. The unattended robot user may provide assigned identification information, identifying the specific unattended robot as an authorized entity, and an authentication key to the logon system, after which the device upon onto which the unattended robot is accessing encrypted data may proceed to use the authentication information housed within the individually encrypted credential bin secured within the Credential HSM to logon, and the robot may then perform planned tasks.

Figure 6:
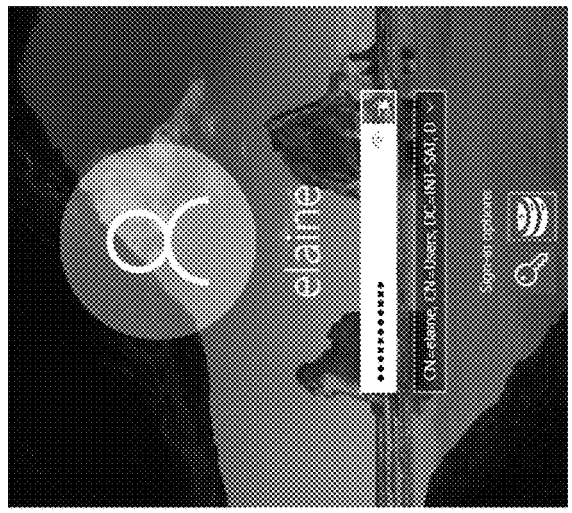
FIG. 6 illustrates various features of an example implementation of a logon system within a domain logon environment, in accordance with aspects of the present disclosure.
Figure 6:
Figure 6:
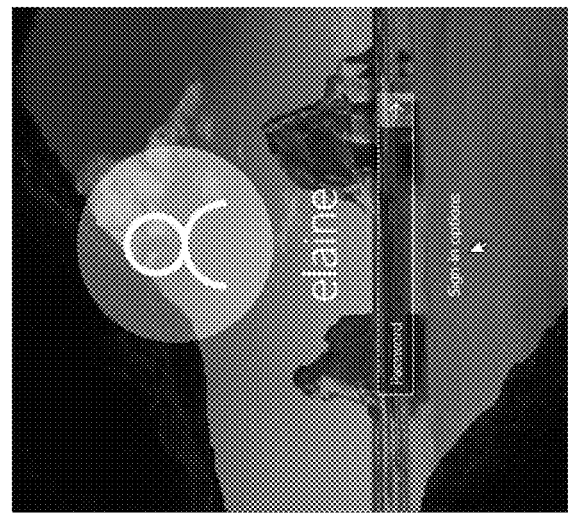

FIG. 6 illustrates GUI screens for an example a logon environment for use during login by a human user, such as user 110, as illustrated in FIG. 1.

Figure 7:
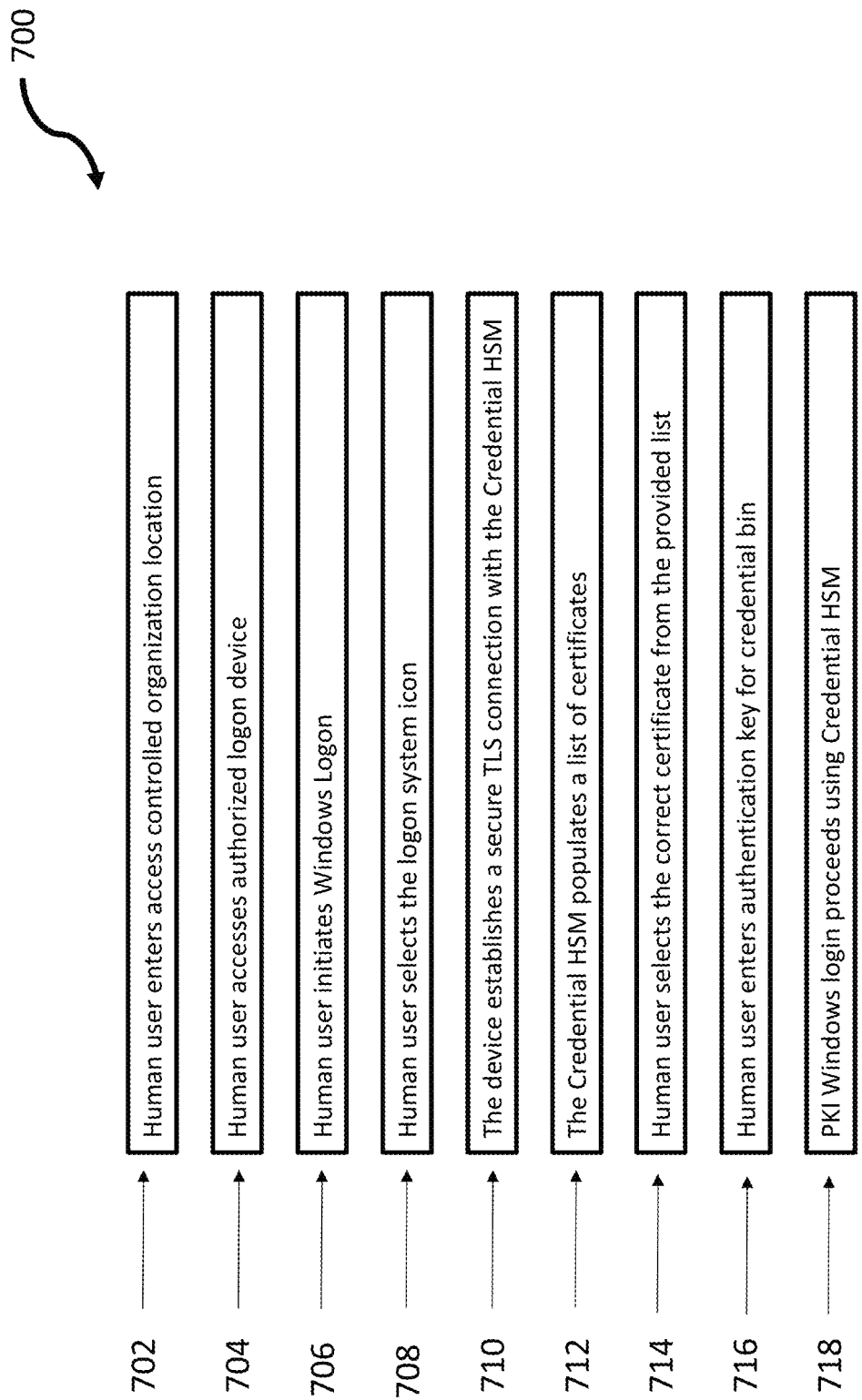
FIG. 7 illustrates various features of an example method flow of an implemented logon system, in accordance with aspects of the present disclosure.

FIG. 7 illustrates a method flow diagram for use of a logon system by a human user within a logon environment, such as the logon environment of FIGS. 1-6. In method flow 700, a human user may enter an access controlled organization location 702, wherein the access controlled location may be the headquarters, office or another physical station of the client organization, such as the official headquarters of the Department of Defense, for example. Next, the human user may access an authorized logon device 704, and initiate a Logon 706. Thereafter, the human user may select the logon system icon 708, and in response the device may establish a secure TLS connection with the Credential HSM 710, and the Credential HSM may populate a list of certificates 712. The human user may then select the correct certificate from the provided list 714 and subsequently enter the authentication key to access authentifying information housed within a corresponding individually encrypted credential bin 716. Finally, method 700 may conclude with the PKI login proceeding with use of the previously accessed authenticating credentials housed within the Credential HSM. Among other advantages, within this process, the authenticating credentials never leave the Credential HSM environment, such that there may exist a lower probability in comparison to other PKI multi-factor authentication systems that the authenticating information is at risk of being compromised by an unauthorized entity.

Figure 8A:
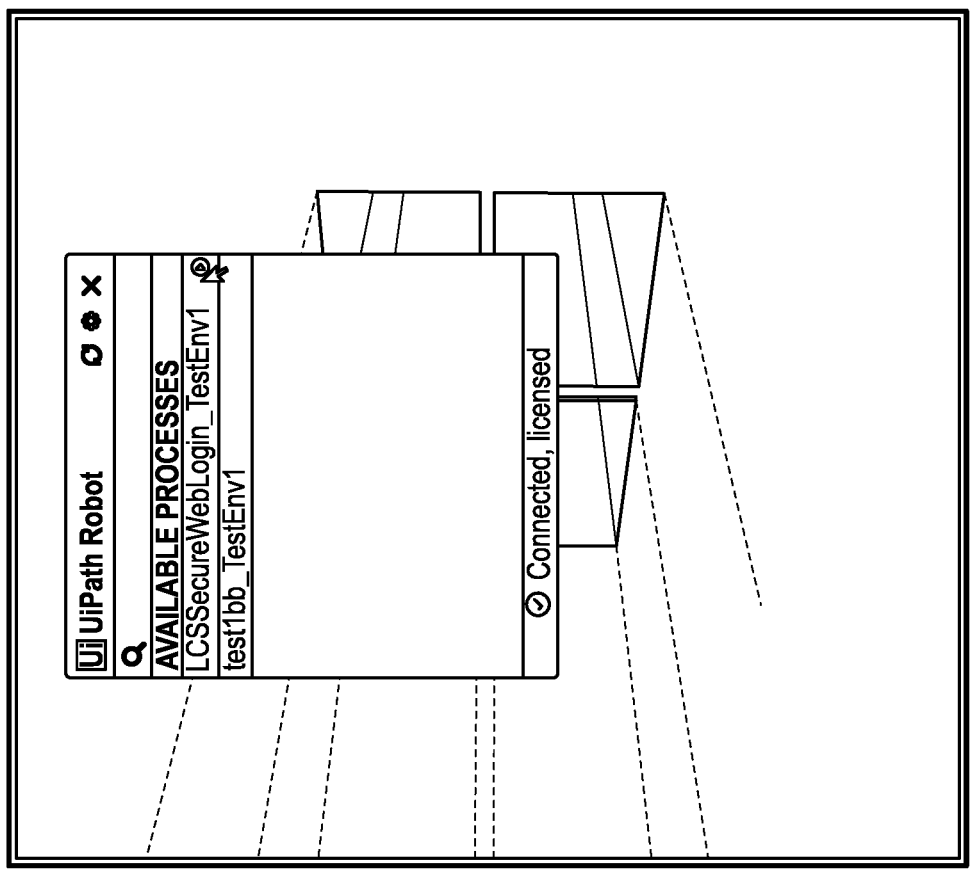
FIGS. 8A and 8B illustrate various features of an example implementation of a logon system in accordance with aspects of the present disclosure.
Figure 8B:
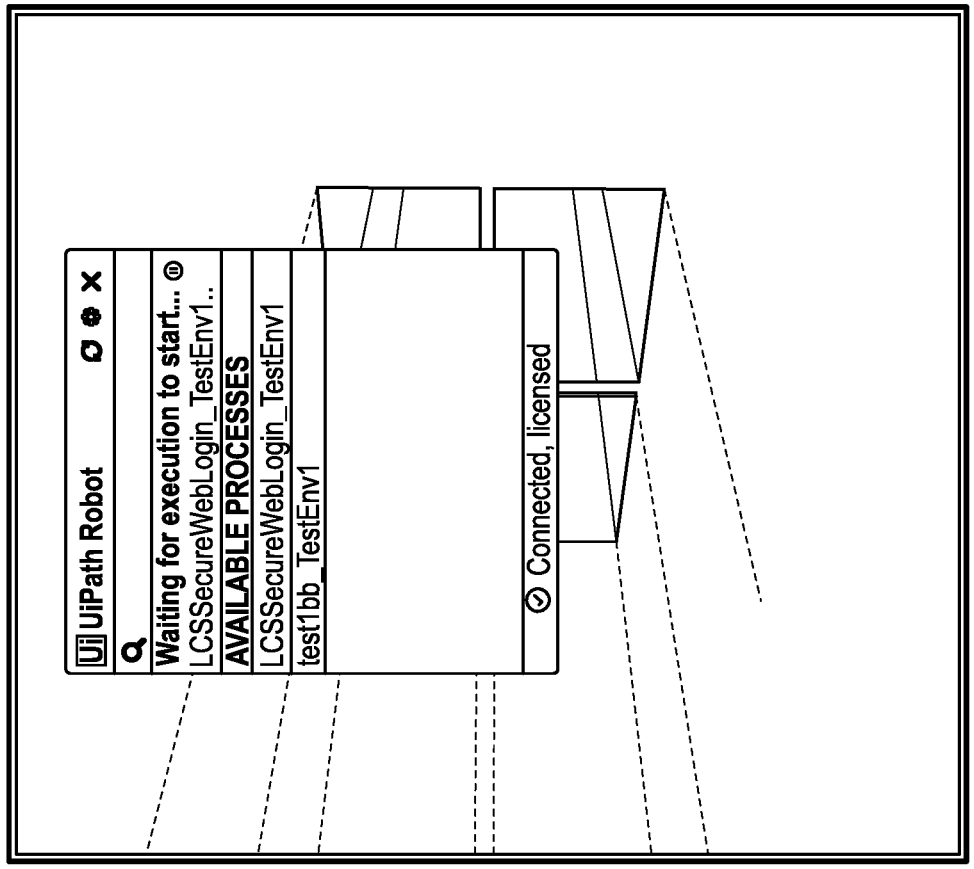
Figure 9A:
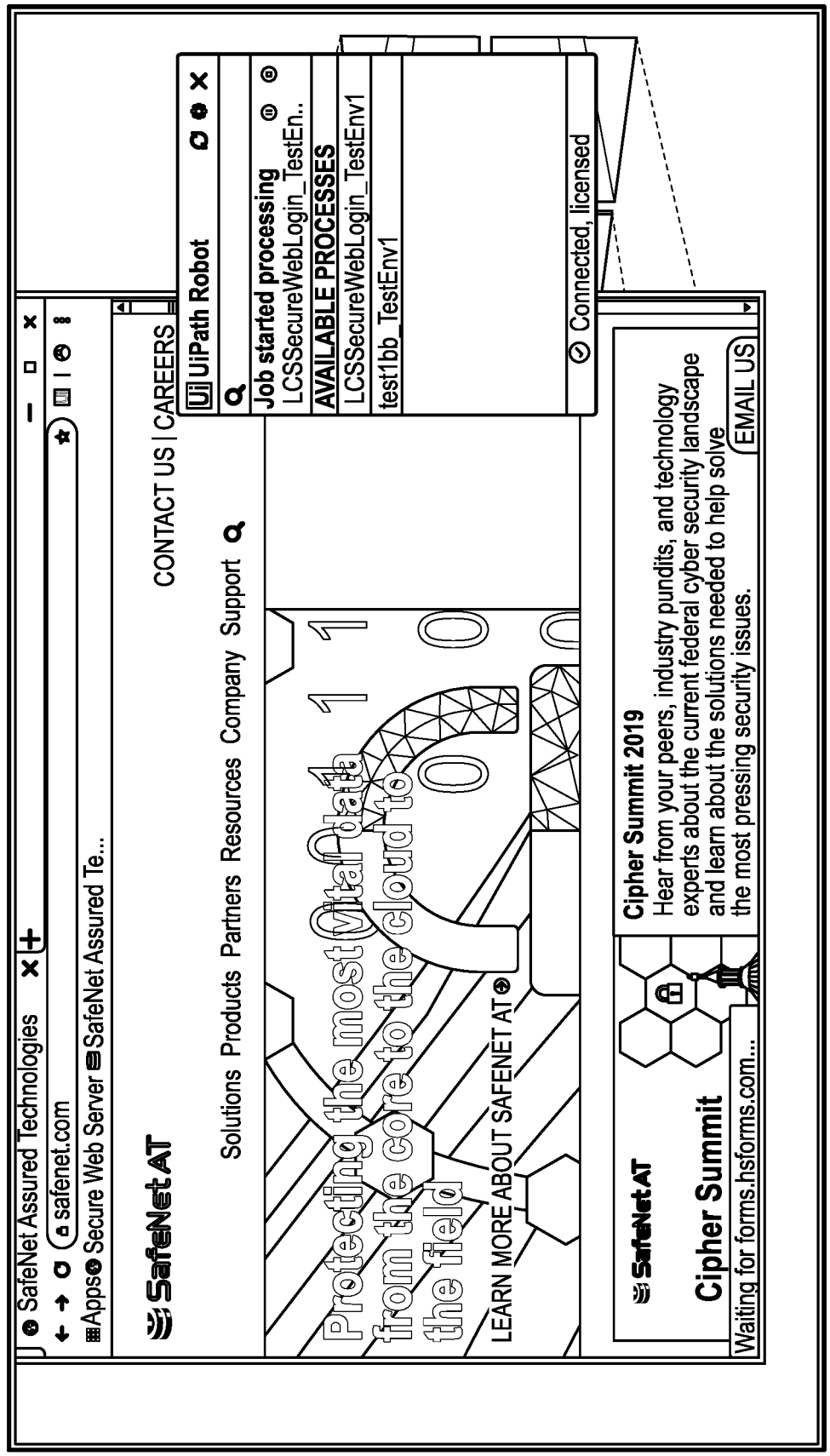
FIGS. 9A and 9B illustrate various features of an example implementation of a logon system from a non-secure web page, in accordance with aspects of the present disclosure.
Figure 9B:
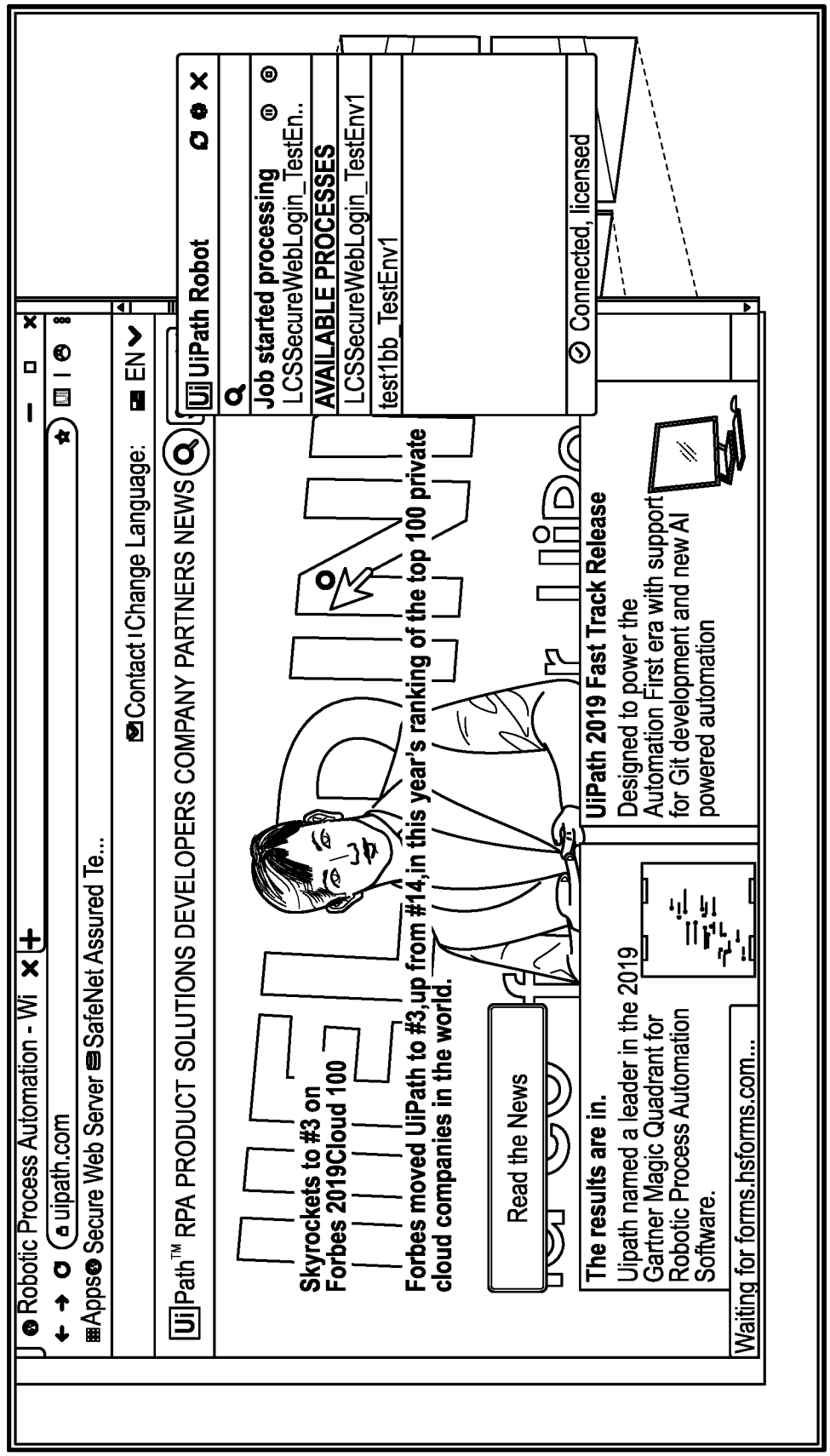
Figure 10A:
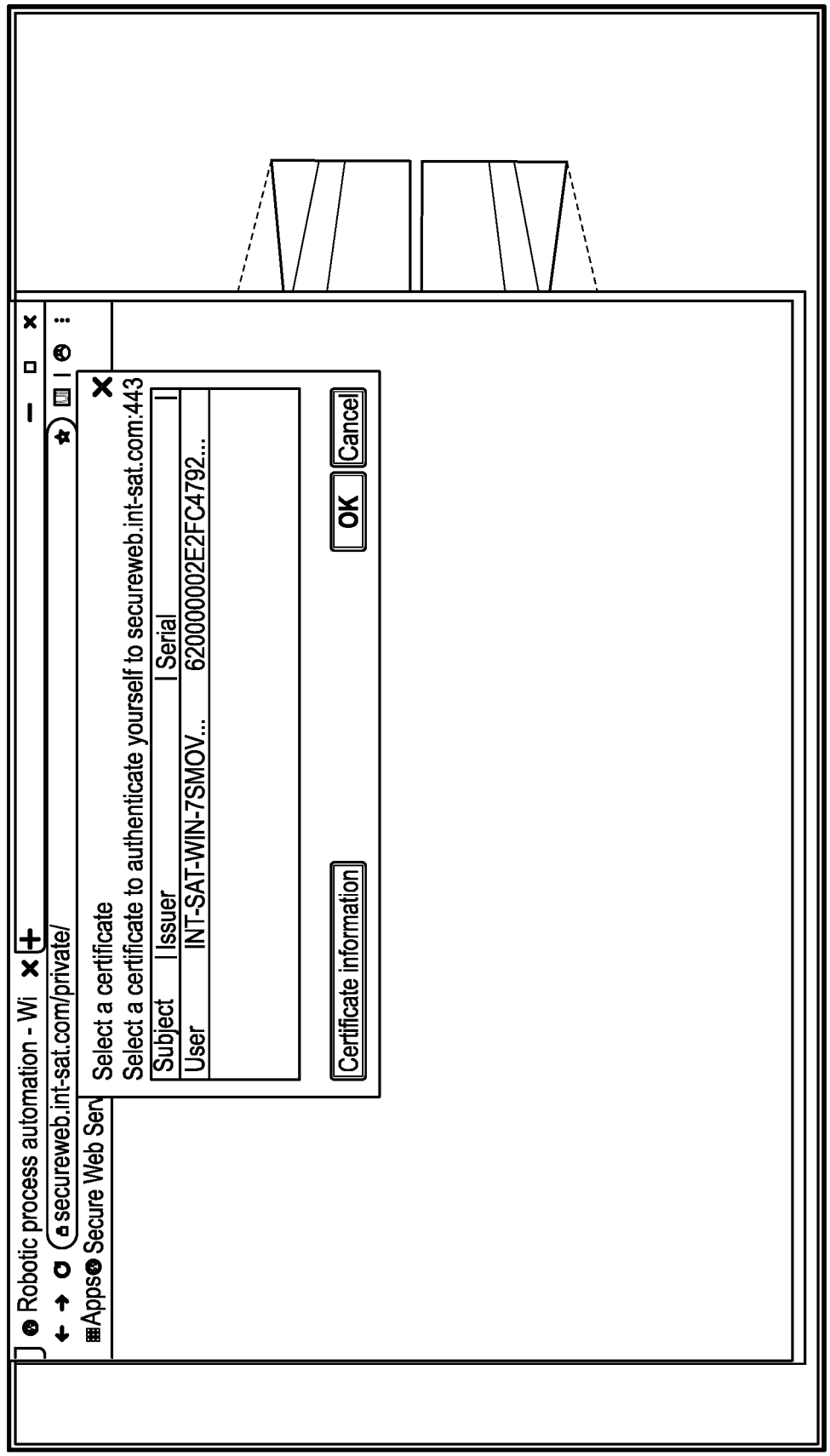
FIGS. 10A and 10B illustrate various features of an example implementation of a logon system, in accordance with aspects of the present disclosure.
Figure 10B:
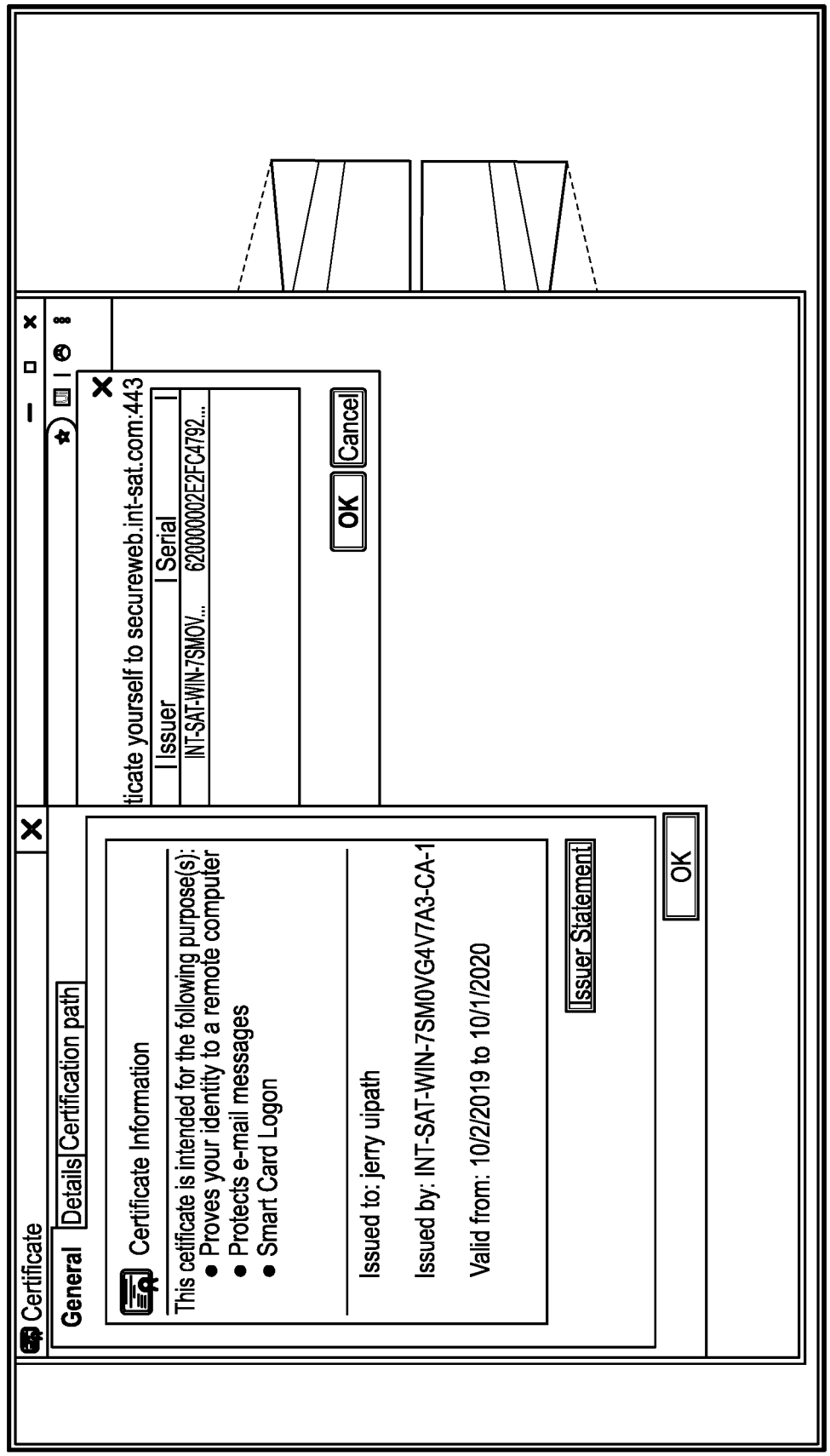
Figure 11A:
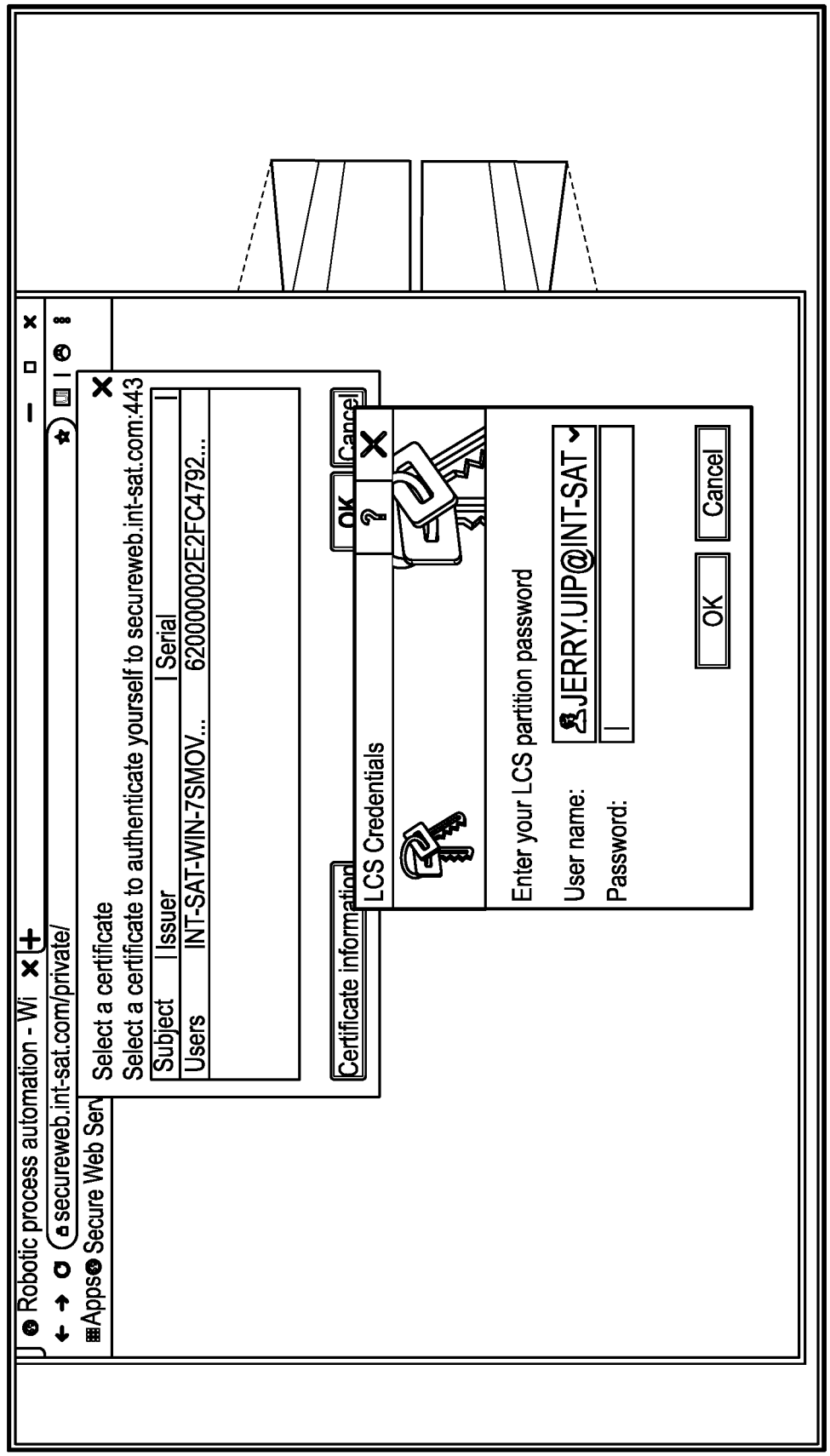
FIGS. 11A and 11B illustrate various features of an example implementation of a logon system, in accordance with aspects of the present disclosure.
Figure 11B:
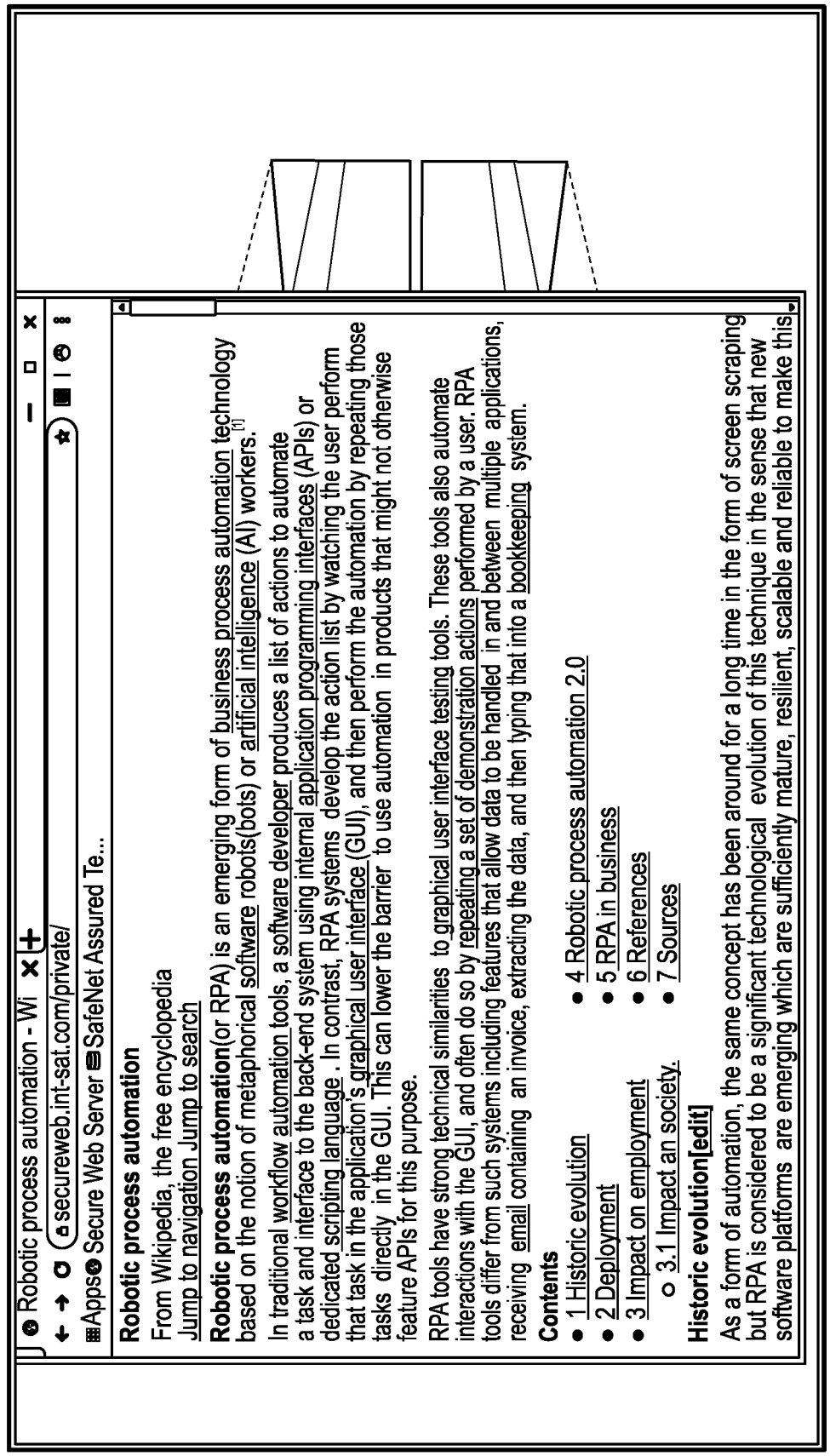

FIGS. 8A-11B illustrate various GUI screens relating to an example implementation of a logon system within a secure web site logon environment by an attended robot user. FIGS. 8A and 8B show example GUI screens at initial access. FIGS. 9A and 9B illustrate example GUI screens for an attended robot user navigating to a non-secure web page, in comparision to FIGS. 10A and 10B, which illustrate GUI screens showing the attended robot user accessing a secure web page, wherein a certificate credential is requested for access. Further FIGS. 10A and 10B, demonstrates the attended robot user selecting the correct certificate from a list of certificates provided by Credential HSM. FIGS. 11A and 11B illustrate GUI screens relating to successful access to and securing of connection with a secured web site.

Figure 12:
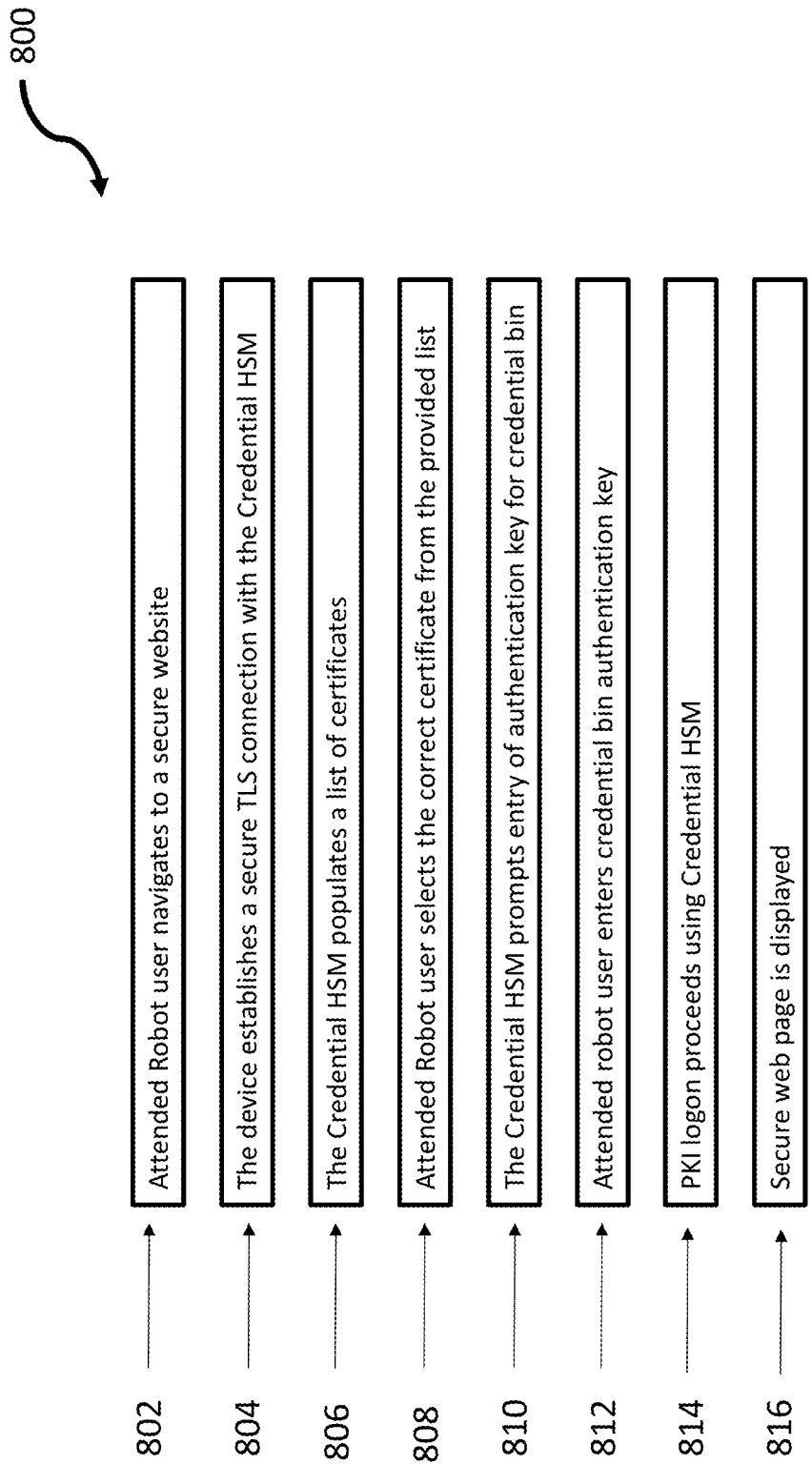
FIG. 12 illustrates various features of an example method flow of an implemented logon system, in accordance with aspects of the present disclosure.
Figure 13B:
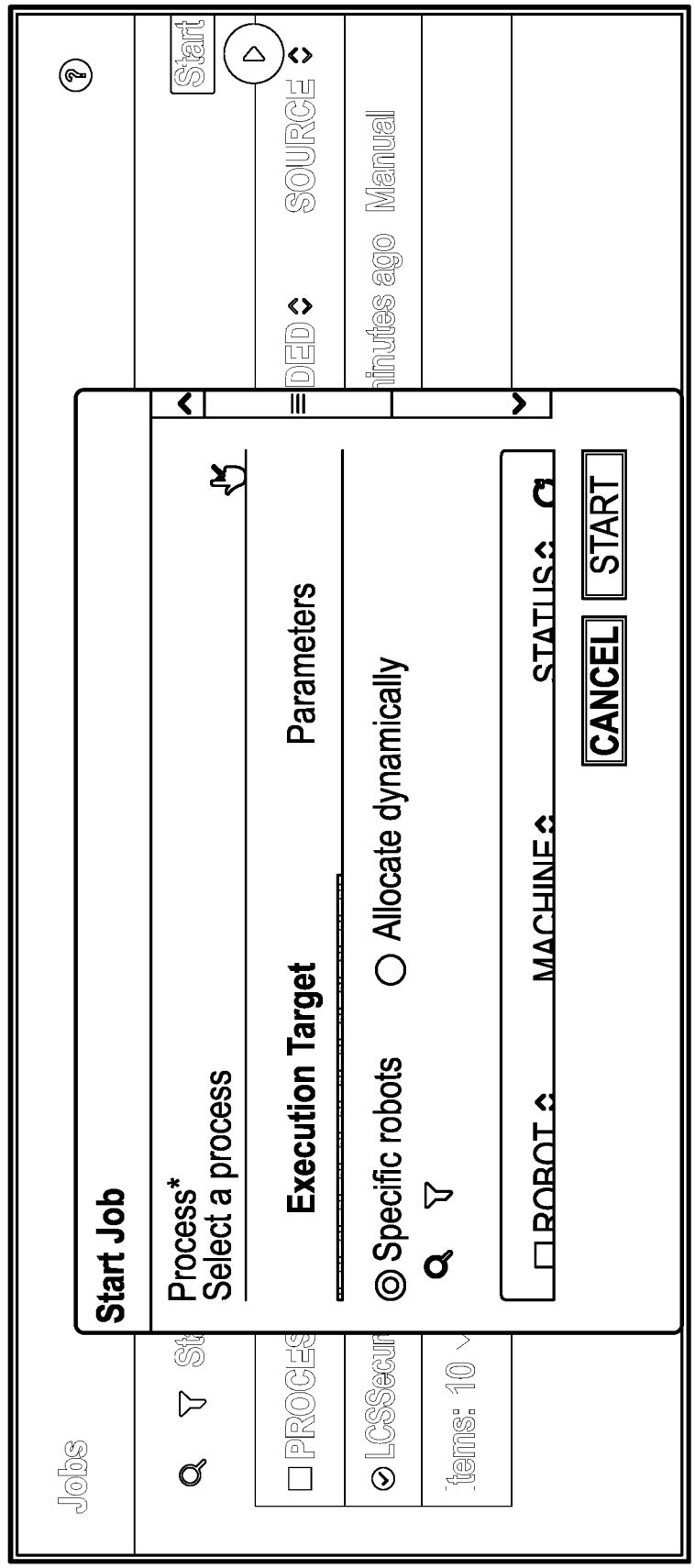
Figure 14A:
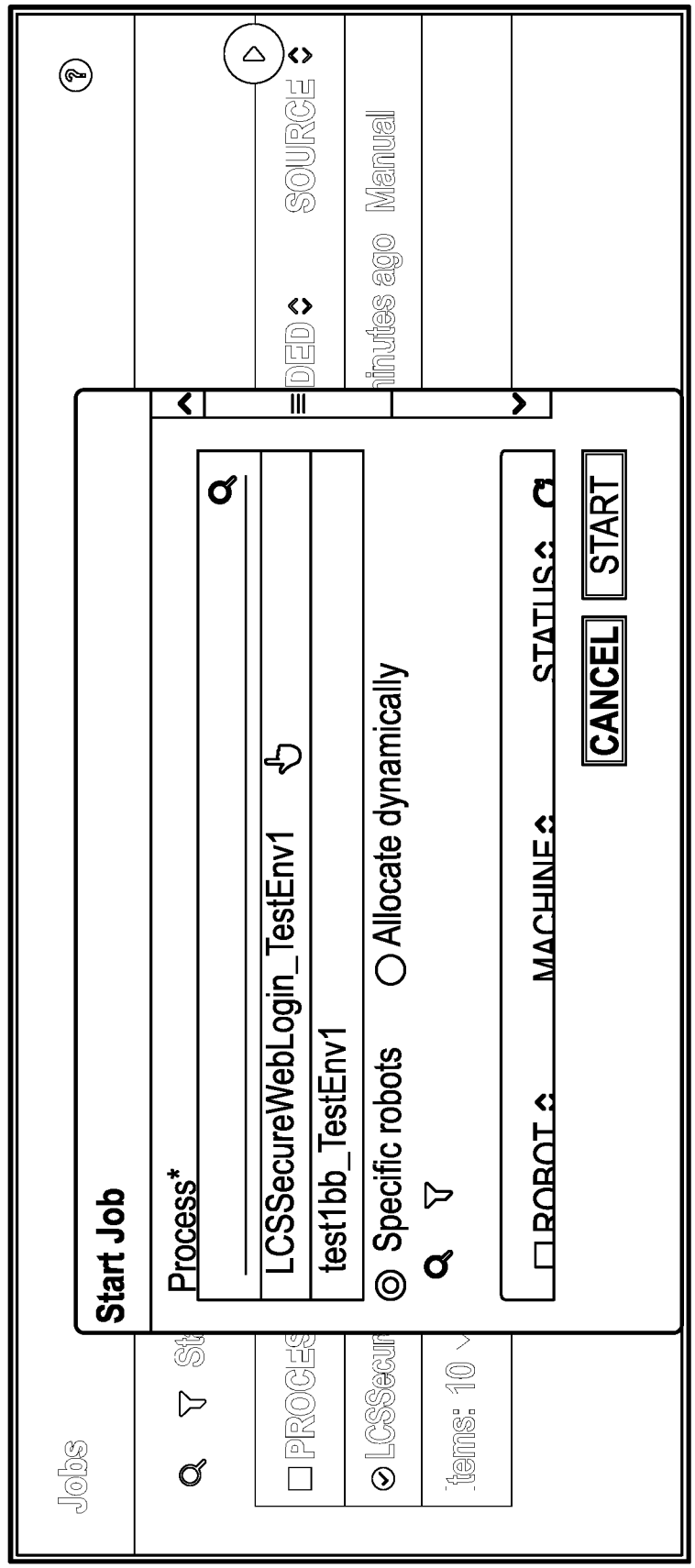
FIGS. 14A and 14B illustrate various features of an example implementation of a logon system, in accordance with aspects of the present disclosure.
Figure 14B:
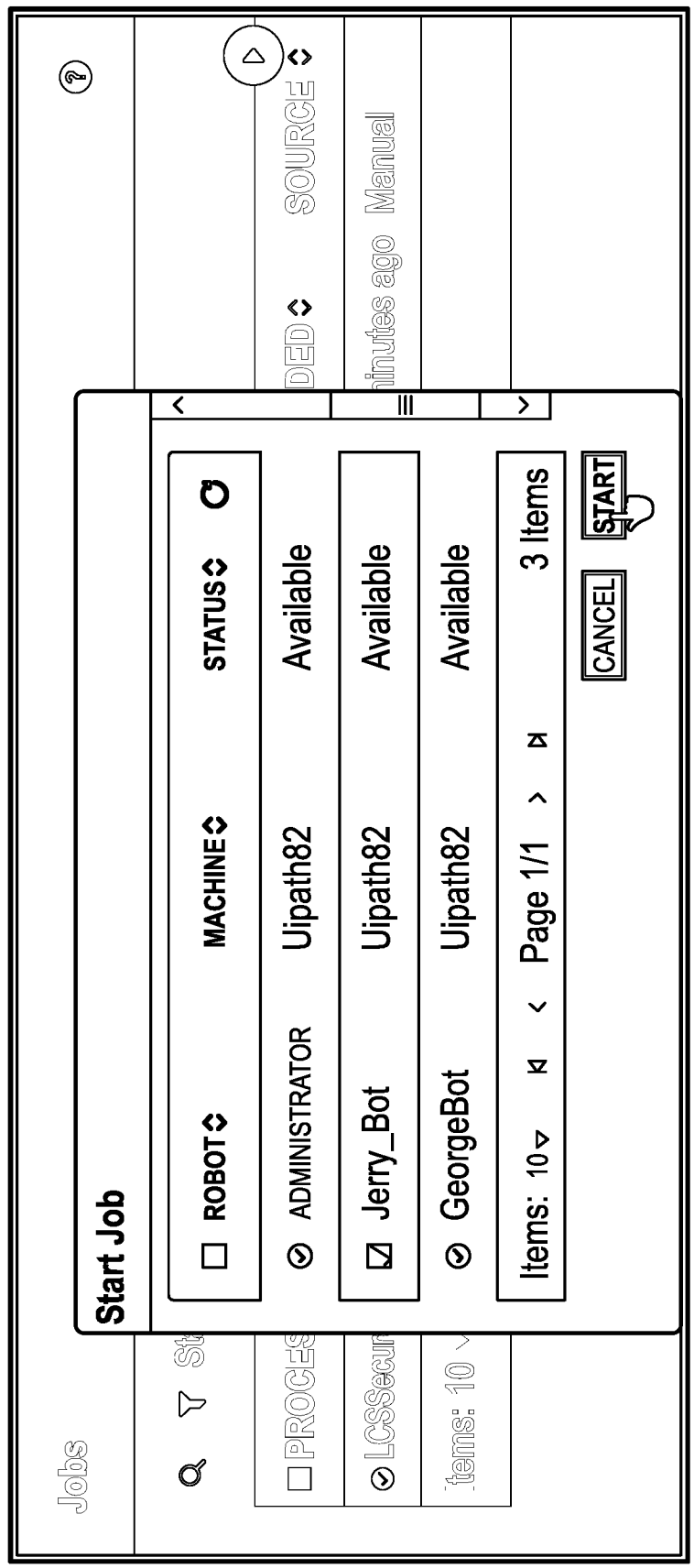
Figure 15B:
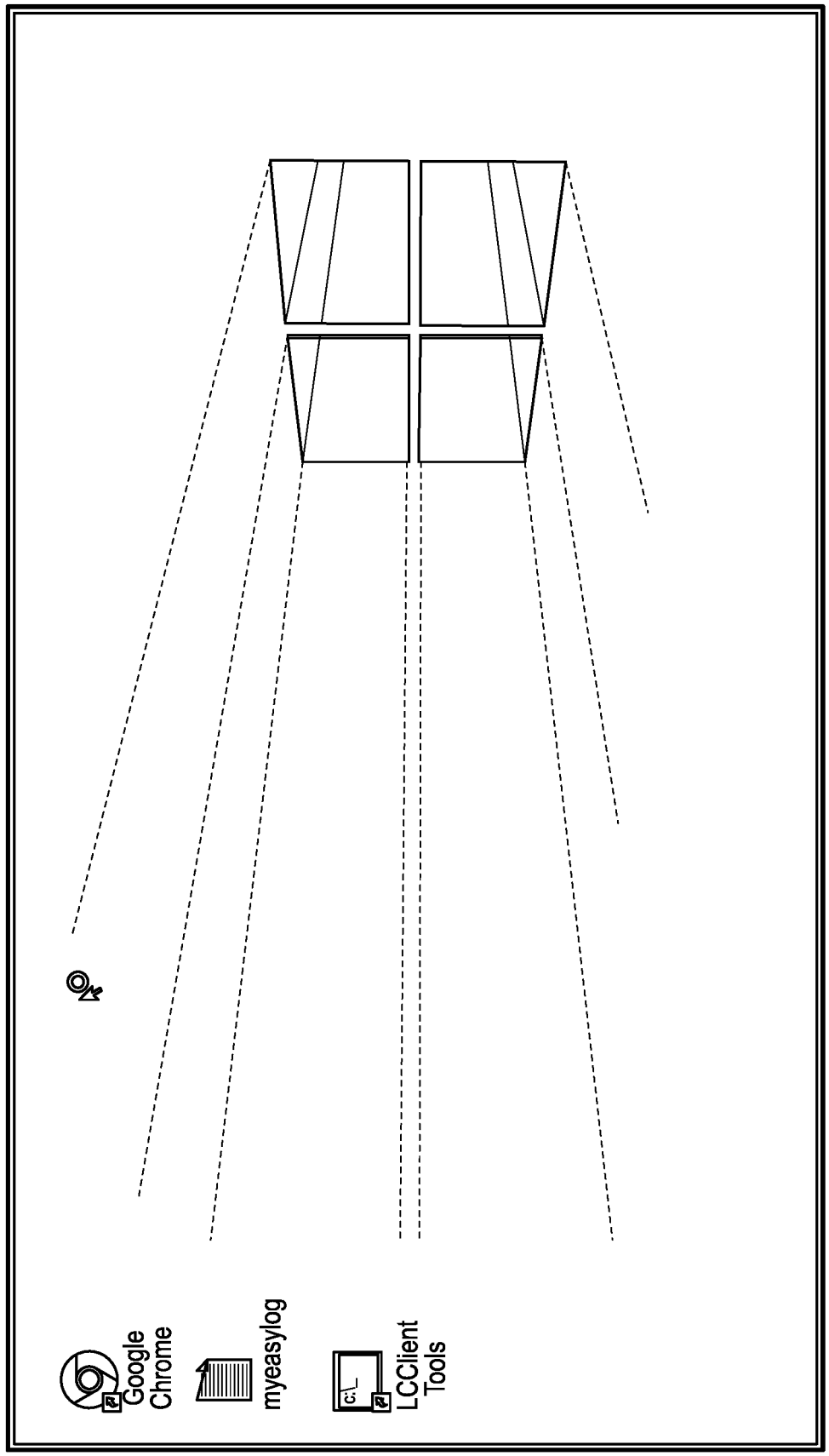

FIG. 12 illustrates an example method flow corresponding to the example implementation of FIGS. 8A-11B, wherein a logon system is implemented by an attended robot user within a secure web site logon environment. Method 800 may first include an attended robot user navigating to a secure website on an authorized device 802, such as a computer, phone, etc. Next, the device may establish a secure TLS connection with the Credential HSM 804. In response the Credential HSM may populate a list of certificates 806. The attended robot user may then select the correct certificate from the provided list 808, and the Credential HSM may prompt entry of an authentication key for access to a corresponding individually encrypted credential bin 810. In response, the attended robot user may enter the credential bin authentication key 812. The method may conclude the PKI logon proceeding using the authenticating credentials stored within the Credential HSM 814, and the secure web page being displayed 816.

According to an aspect of the present disclosure, FIGS. 13A-15B illustrate various GUI screens relating an example implementation of a logon system by an unattended robot user within a logon environment, corresponding to the example illustrated in FIG. 5.

Figure 16:
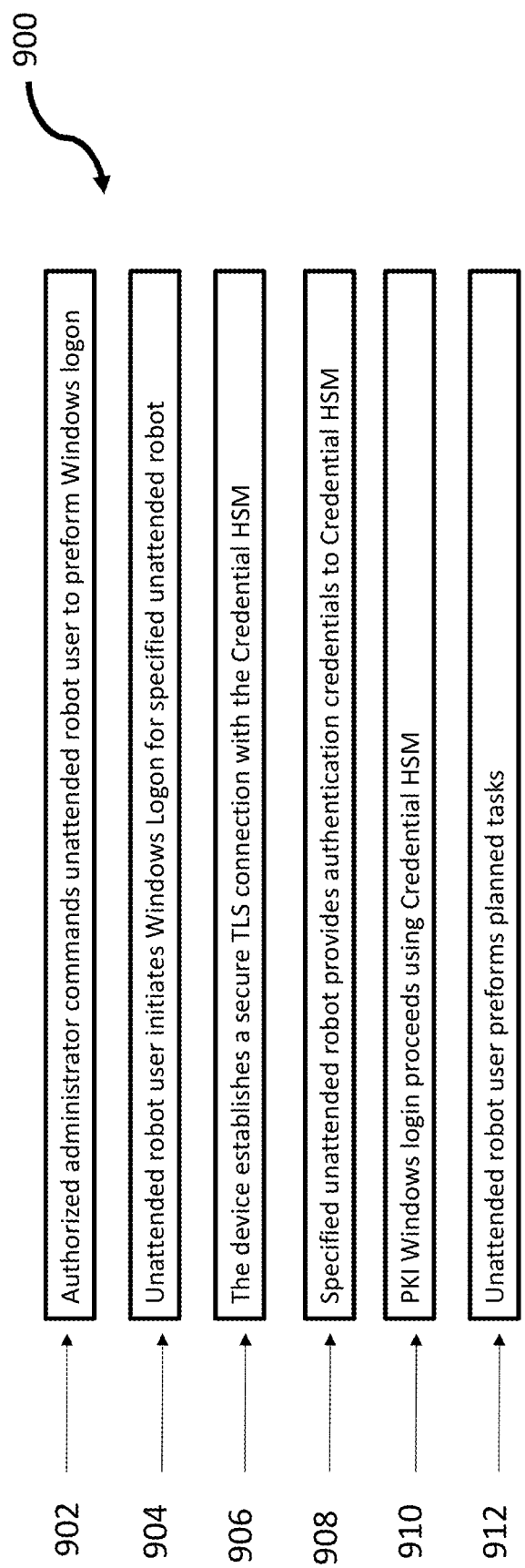
FIG. 16 illustrates a various features of an example method flow of an implemented logon system, in accordance with aspects of the present disclosure.

FIG. 16 illustrates an example method flow corresponding to the example implementation of FIGS. 13A-15B, wherein a logon system is implemented by an unattended robot user within a logon environment, such as a Windows® logon environment. According to method flow 900, an authorized human administrator may command an unattended robot user to perform a logon 902, wherein the unattended robot user may then initiate a logon for specified unattended robot 904. The device used by the unattended robot user may then establish a secure TLS connection with the Credential HSM 906. The specified unattended robot may then provide authentication credentials to the Credential HSM 908, such as for access to the corresponding individually encrypted credential bin (e.g., credential bin 122 as illustrated in FIG. 2). The method may conclude when a PKI logon proceeding, using the identifying credentials housed within the corresponding individually encrypted credential bin securely located within the Credential HSM 910, such that after successful access, the unattended robot user may preform planned tasks 912.

Figure 18B:
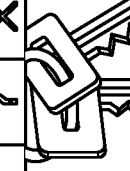
Figure 18C:
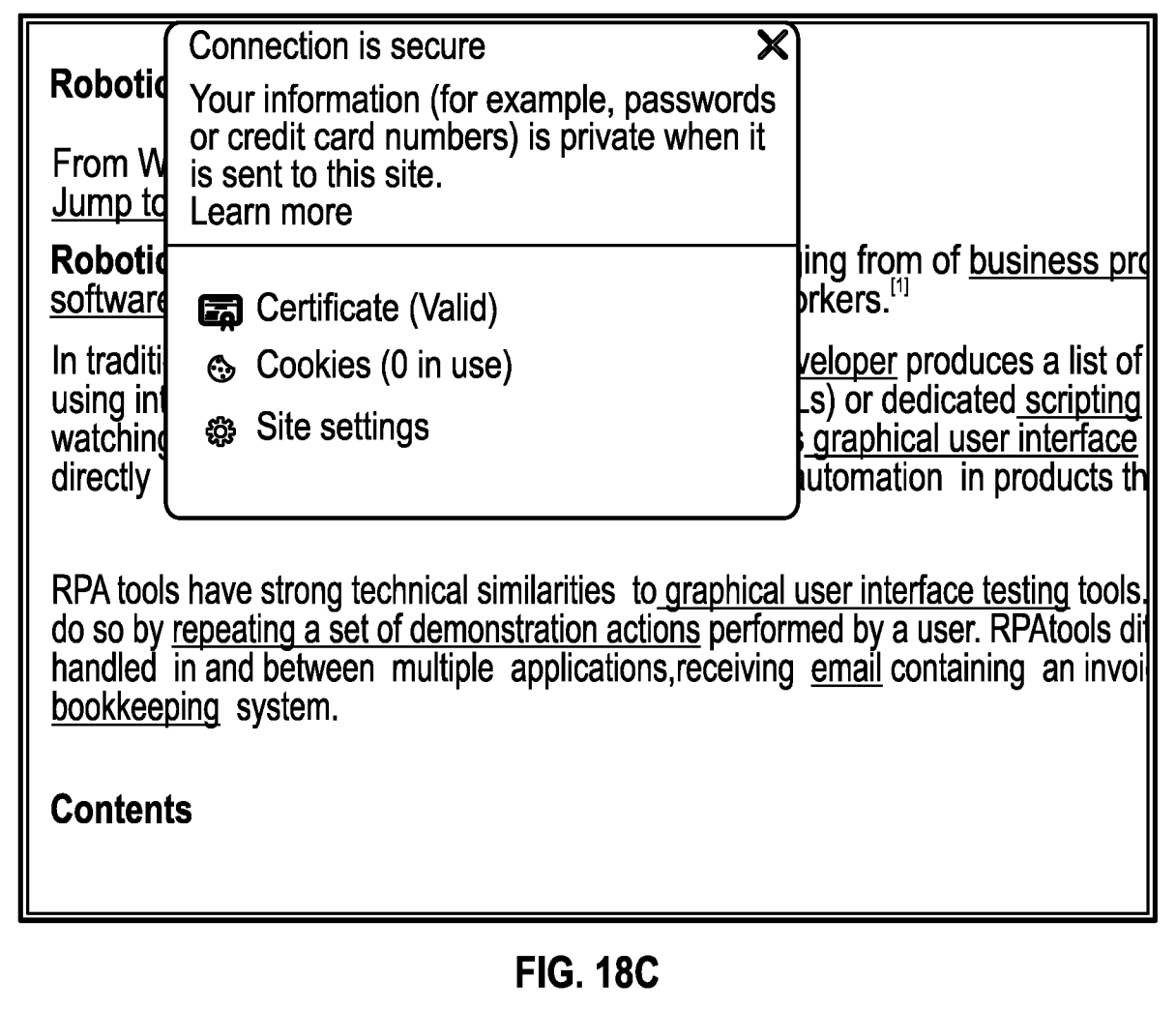

FIGS. 17A-18C illustrate various GUI screens relating an example implementation of a logon system within a secure web page logon environment initiated by a human user. FIGS. 17A-17B illustrate GUI screens for human user navigating to a secure website logon, wherein individual authentication is required to access the secure web page. Subsequently, FIGS. 18A-18C illustrate the successful selection of the correct certificate by the human user, the request for authentication information entry, and finally, the successfully accessed and securely connected web page, respectfully.

Figure 19:
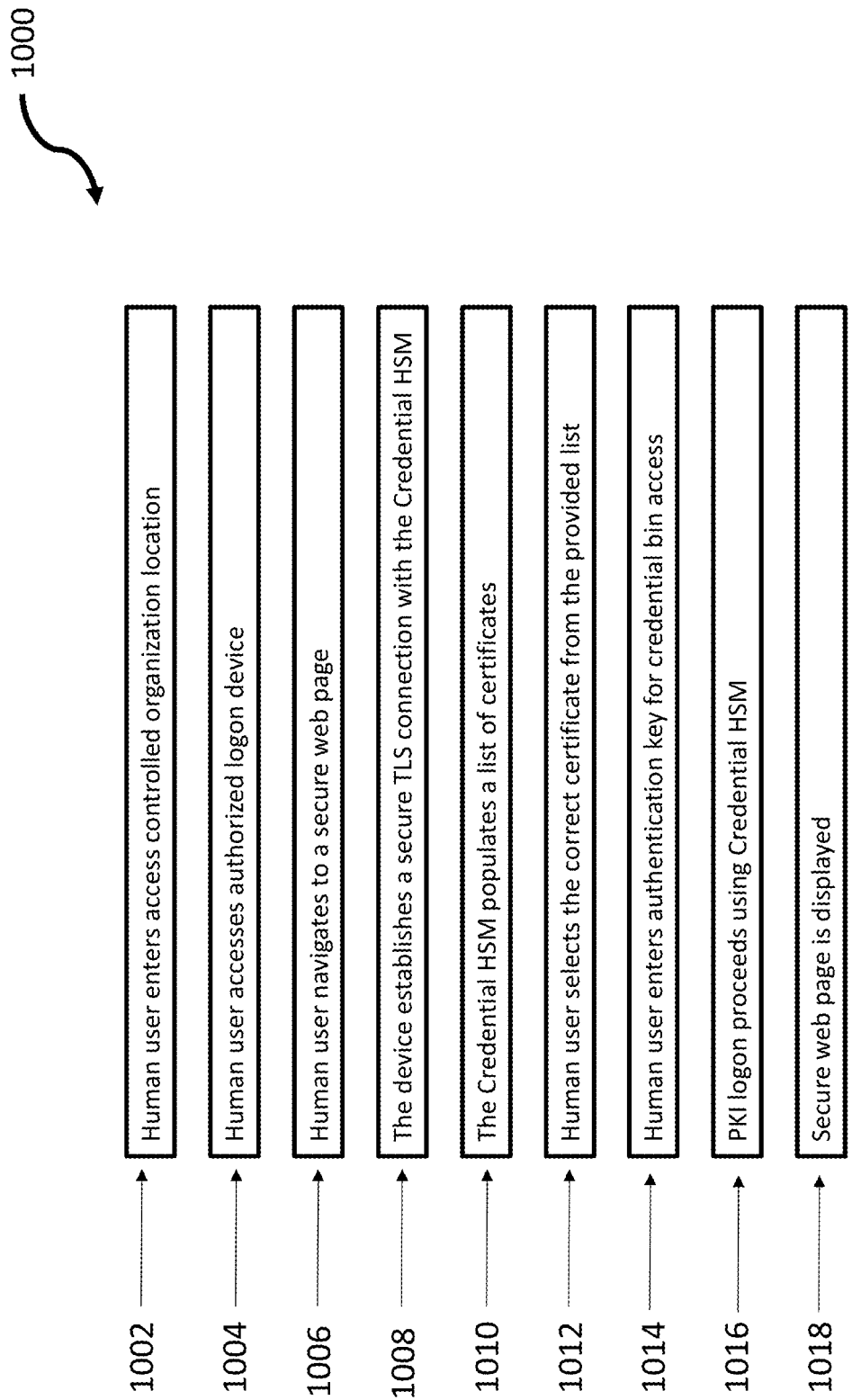
FIG. 19 illustrates a various features of an example method flow of an implemented logon system, in accordance with various aspects of the present disclosure.

FIG. 19 illustrates an example method flow diagram for use of a logon system by a human user within a logon environment, such as the logon environment of FIGS. 17A-18C. According to method flow 1000, a human user may enter an access controlled location 1002, wherein the access controlled location may be the headquarters, office or another station of the client organization, such as the Department of Defense headquarters. Next, the human user may access an assigned or otherwise authorized logon device 1004, such as a computer, phone, etc. The human user may then navigate to a secure web page from the logon device 1006, whereupon the device may establish a secure TLS connection with the Credential HSM 1008. Then, Credential HSM may populate a list of certificates stored within the Credential HSM 1010 and the human user may then select the correct certificate from the provided list 1012 and enter an authentication key in order to access the individual encrypted credential bin 1014. Finally, the method 1000 may include the PKI logon proceeding with using the Credential HSM 1016 such that the secure web page is displayed 1018, such as to the authorized human user.

Figure 20:
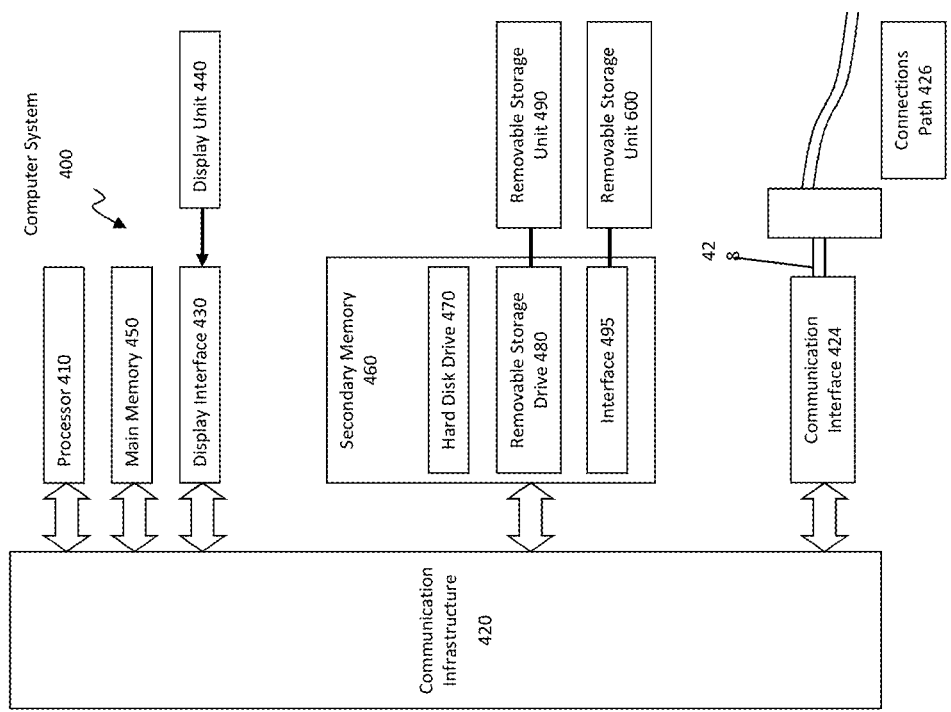
FIG. 20 contains a representative diagram of an example computer system capable of carrying out functionality described in example implementations in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 400 is shown in FIG. 20.

Computer system 400 includes one or more processors, such as processor 404. The processor 410 is coupled to a communication infrastructure 420 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 400 may include a display interface 430 that forwards graphics, text, and other data from the communication infrastructure 420 (or from a frame buffer not shown) for display on a display unit 440. Computer system 400 may include a main memory 450, preferably random access memory (RAM), and may also include a secondary memory 460. The secondary memory 460 may include, for example, a hard disk drive 470 and/or a removable storage drive 480, representing a floppy disk drive, a magnetic tape drive, an optical disk drive, etc. The removable storage drive 480 may read from and/or write to a removable storage unit 490 in a well-known manner. Removable storage unit 490, represents a floppy disk, magnetic tape, optical disk, etc., which may be read by and written to removable storage drive 480. As will be appreciated, the removable storage unit 418 may include a computer usable storage medium having stored therein computer software and/or data.

Alternative aspects of the present disclosure may include secondary memory 460 and may include other similar devices for allowing computer programs or other instructions to be loaded into computer system 400. Such devices may include, for example, a removable storage unit 490 and an interface 495. Examples of such may include a program cartridge and cartridge interface (such as that found in video game devices), a removable memory chip (such as an erasable programmable read only memory (EPROM), or programmable read only memory (PROM)) and associated socket, and other removable storage units 490 and interfaces 495, which allow software and data to be transferred from the removable storage unit 490 to computer system 400.

Computer system 400 may also include a communications interface 424. Communications interface 424 may allow software and data to be transferred among computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via a communications path (e.g., channel) 426. This path 426 may carry signals 428 and may be implemented using wire or cable, fiber optics, a telephone line, a cellular link, a radio frequency (RF) link and/or other communications channels. As used herein, the terms "computer program medium" and "computer usable medium" refer generally to media such as a removable storage drive 480, a hard disk installed in hard disk drive 470, and/or signals 428. These computer program products may provide software to the computer system 400. Aspects of the present disclosure are directed to such computer program products.

Computer programs (also referred to as computer control logic) may be stored in main memory 450 and/or secondary memory 460. Computer programs may also be received via communications interface 424. Such computer programs, when executed, may enable the computer system 400 to perform the features in accordance with aspects of the present disclosure, as discussed herein. In particular, the computer programs, when executed, may enable the processor 410 to perform the features in accordance with aspects of the present disclosure. Accordingly, such computer programs may represent controllers of the computer system 400.

Where aspects of the present disclosure may be implemented using software, the software may be stored in a computer program product and loaded into computer system 400 using removable storage drive 414, hard drive 412, or communications interface 420. The control logic (software), when executed by the processor 404, may cause the processor 404 to perform the functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present disclosure may be implemented using a combination of both hardware and software.

Figure 21:
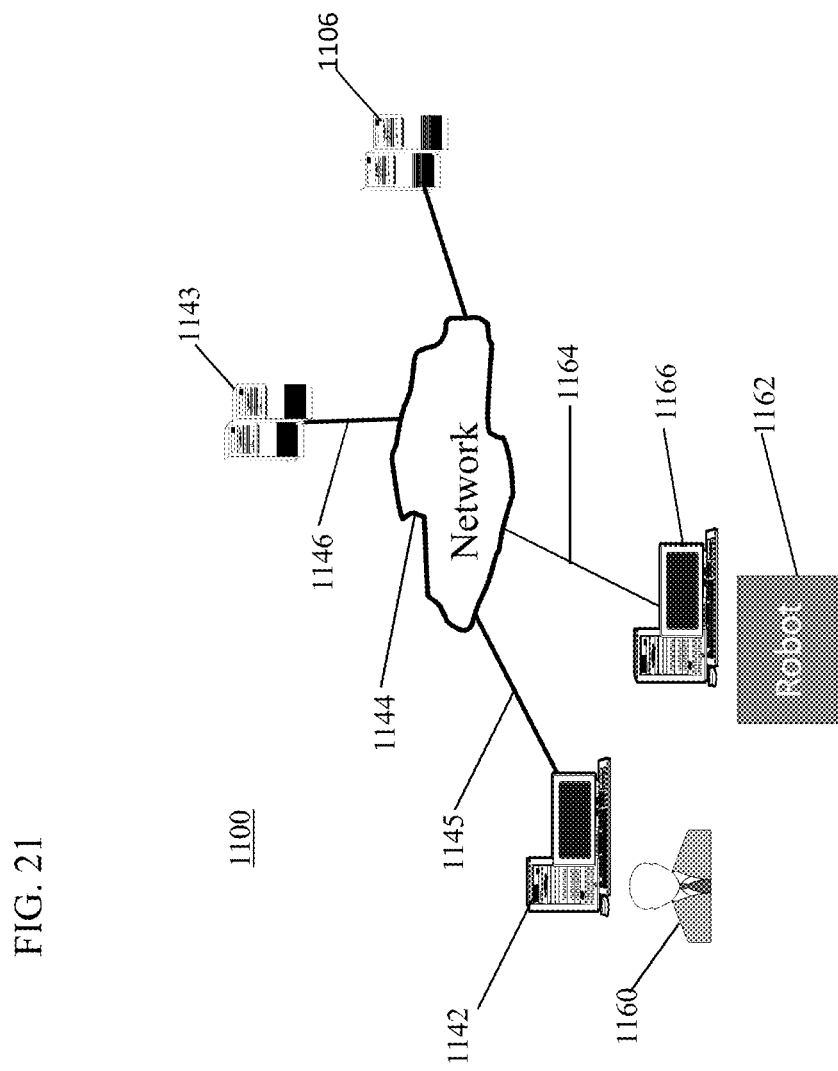
FIG. 21 is a block diagram of various example system components usable in accordance with aspects of the present disclosure.

FIG. 21 is a representative diagram of various example system components, for use in accordance with aspects of the present disclosure. The communication system 1100 may include one or more accessors 1160, 1162 (also referred to interchangeably herein as one or more "users") wherein user 1160 may be a human accessor and user 1162 may be a software robot, or other similar, non-human, automating technology, and one or more terminals 1142, 1166. In one aspect, data for use in accordance with the present disclosure may, for example, be input and/or accessed by accessors 1160, 1162 via terminals 1142, 1166, such as personal computers (PCs), minicomputers, mainframe computers, microcomputers, telephonic devices, or wireless devices, such as personal digital assistants ("PDAs"), smart phones, or other hand-held wireless devices coupled to servers 1143, 1106, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. In one example, server 1143 may comprise a Credential HSM, wherein server 1106 may comprise a server for serving encrypted data or other secure information, such as encrypted data 106, illustrated in FIG. 1. The couplings 1145, 1146, 1164 include, for example, wired, wireless, or fiberoptic links. The wired or wireless connectivity, may include, but not be limited to one or more universal serial bus (USB) connections, wireless fidelity ("Wi-Fi") coupling, Bluetooth or Bluetooth Low Energy (BLE) coupling, Ethernet connection, cable connection, digital subscriber line (DSL) connection, cellular coupling (e.g., 3G, LTE/4G or 5G), or other suitable coupling or couplings.

The aspects discussed herein can also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A system, comprising:
    an electronic device comprising a unique identification number, wherein the unique identification number is associated with the electronic device and is independent of any user, and the electronic device is configured to receive a user authentication key from a user;
    a remote server comprising a Hardware Security Module (HSM) including individually encrypted credential bins, wherein each of the individually encrypted credential bins corresponds to a particular user and a particular electronic device and is configured to store authenticating credentials; and
    a secure link coupling the electronic device to the remote server;
    wherein the electronic device is configured to:
        receive from the HSM through the secure link a list of certificates stored in the HSM,
        receive from the user a selected certificate from the list of certificates,
        transmit to the HSM the user authentication key received from the user and the unique identification number associated with the electronic device to access authenticating credentials corresponding to the selected certificate, and
        perform a login of the user into a Public Key Infrastructure (PKI) enabled system using the accessed authenticating credentials such that the authenticating credentials never leave an environment of the HSM,
        wherein the authenticating credentials are used to log into the PKI enabled system after the unique identification number of the electronic device matches a predetermined unique identification number stored on the remote server, and
        wherein the electronic device is configured to apply the authenticating credentials as the login to the PKI enabled system for the user.

2. The system of claim 1, wherein the user is a human or a robot.

3. The system of claim 1, wherein the electronic device comprises a terminal coupled to a network.

4. A method, comprising:
    storing a unique identification number on an electronic device, the unique identification number being based on the electronic device and is independent of any user;
    receiving a user authentication key from a user;
    generating a secure link between the electronic device and a remote server comprising a Hardware Security Module (HSM);
    receiving from the HSM through the secure link a list of certificates stored in the HSM;
    receiving from the user a selected certificate from the list of certificates;
    transmitting to the HSM the user authentication key received from the user and the unique identification number associated with the electronic device;
    receiving, from the HSM, authenticating credentials corresponding to the selected certificate;
    performing a login of the user into a Public Key Infrastructure (PKI) enabled system using the received authenticating credentials such that the authenticating credentials never leave an environment of the HSM;
    wherein the authenticating credentials are used to log into the PKI enabled system after the unique identification number of the electronic device matches a predetermined unique identification number stored on the remote server; and
    wherein the electronic device applies the received authenticating credentials as the login to the PKI enabled system for the user.

5. The method of claim 4, wherein the user is a human or a robot.

6. The method of claim 4, wherein the electronic device comprises a terminal coupled to a network.

7. A non-transitory computer-readable storage medium containing executable computer program code, the code comprising instructions configured to cause an electronic device to:
- store a unique identification number on the electronic device, the unique identification number being based on the electronic device and is independent of any user;
- receive a user authentication key from a user;
- generate a secure link between the electronic device and a remote server comprising a Hardware Security Module (HSM);
- receive from the HSM through the secure link a list of certificates stored in the HSM;
- receive from the user a selected certificate from the list of certificates;
- transmit to the HSM the user authentication key received from the user and the unique identification number associated with the electronic device;
- receive, from the HSM, authenticating credentials corresponding to the selected certificate;
- perform a login of the user into a Public Key Infrastructure (PKI) enabled system using the received authenticating credentials such that the authenticating credentials never leave an environment of the HSM;
- wherein the authenticating credentials are used to log into the PKI enabled system after the unique identification number of the electronic device matches a predetermined unique identification number stored on the remote server; and
- wherein the received authenticating credentials are applied as the login to the PKI enabled system for the user.

8. The computer-readable medium of claim 7, wherein the user is a human or a robot.

9. The computer-readable medium of claim 7, wherein the electronic device comprises a terminal coupled to a network.

* * * * *